United States Patent
Yang et al.

(10) Patent No.: US 11,102,690 B2
(45) Date of Patent: Aug. 24, 2021

(54) DATA SENDING METHOD, DATA RECEIVING METHOD, DATA TRANSMIT END, AND DATA RECEIVE END

(71) Applicant: Huawei Technologies Co., Ltd., Shenzhen (CN)

(72) Inventors: Jun Yang, Shenzhen (CN); Xiyu Zhou, Shanghai (CN); Jian Chen, Shanghai (CN); Ya Zhang, Shanghai (CN); Jiaxin Li, Shanghai (CN); Yaoying Zhou, Shanghai (CN); Jing Qian, Shanghai (CN); Zhiwei Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 137 days.

(21) Appl. No.: 16/474,179

(22) PCT Filed: Feb. 25, 2017

(86) PCT No.: PCT/CN2017/074892
§ 371 (c)(1),
(2) Date: Jun. 27, 2019

(87) PCT Pub. No.: WO2018/120389
PCT Pub. Date: Jul. 5, 2018

(65) Prior Publication Data
US 2019/0320369 A1 Oct. 17, 2019

(30) Foreign Application Priority Data
Dec. 28, 2016 (CN) .......................... 201611236957.1

(51) Int. Cl.
*H04W 36/00* (2009.01)
*H04W 36/14* (2009.01)
(Continued)

(52) U.S. Cl.
CPC ....... *H04W 36/14* (2013.01); *H04W 36/0005* (2013.01); *H04W 36/22* (2013.01); *H04W 36/30* (2013.01)

(58) Field of Classification Search
CPC . H04W 36/14; H04W 36/0005; H04W 36/30; H04W 36/22
See application file for complete search history.

(56) References Cited

U.S. PATENT DOCUMENTS

2014/0206353 A1* 7/2014 Kim .................. H04W 36/14
455/436
2014/0376473 A1* 12/2014 Leng .................. H04W 28/08
370/329

FOREIGN PATENT DOCUMENTS

CN 101299696 A 11/2008
CN 101568135 A 10/2009
(Continued)

OTHER PUBLICATIONS

Wu, He-Sheng "Research and Application of Multi-Processing Load Balancing Technology Based on Multi-Core in Cloud Computing", Software Institute of Nanjing University, Jun. 2013, 116 pages.

*Primary Examiner* — Moo Jeong
(74) *Attorney, Agent, or Firm* — Slater Matsil, LLP

(57) ABSTRACT

A data sending method, a data receiving method, a data transmit end, and a data receive end are provided. The data sending method includes: obtaining a transmission path used for data transmission, where the transmission path currently uses a first physical link group to transmit data; switching, based on a preconfigured link switching policy and transmission information of the transmission path, a physical link used by the transmission path from the first physical link group to a second physical link group; sending a first link switching notification message to a data receive end, where (Continued)

the first link switching notification message includes information indicating that the physical link used by the transmission path is switched from the first physical link group to the second physical link group; and continuing transmitting the data through a transmission path that uses the second physical link group.

20 Claims, 10 Drawing Sheets

(51) Int. Cl.
*H04W 36/22* (2009.01)
*H04W 36/30* (2009.01)

(56) References Cited

FOREIGN PATENT DOCUMENTS

| | | |
|---|---|---|
| CN | 103200615 A | 7/2013 |
| CN | 104202255 A | 12/2014 |
| CN | 104283780 A | 1/2015 |
| CN | 105848236 A | 8/2016 |
| EP | 2763495 A1 | 8/2014 |
| EP | 3148289 B1 | 9/2018 |
| WO | 2014111618 A1 | 7/2014 |
| WO | 2015192317 A1 | 12/2015 |

* cited by examiner

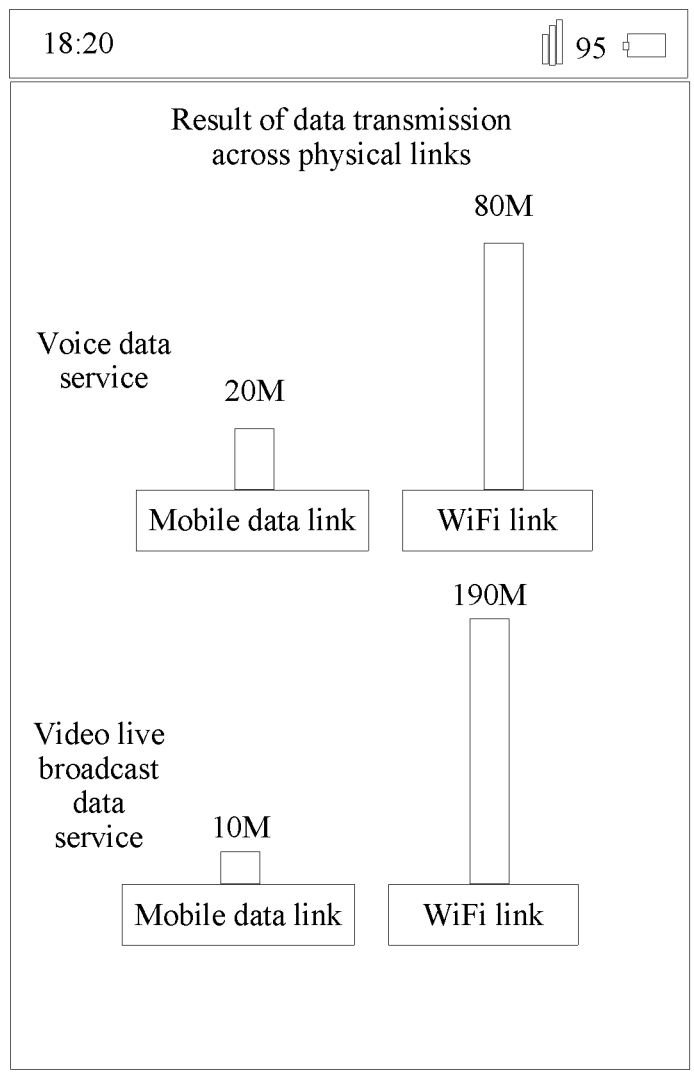
FIG. 9
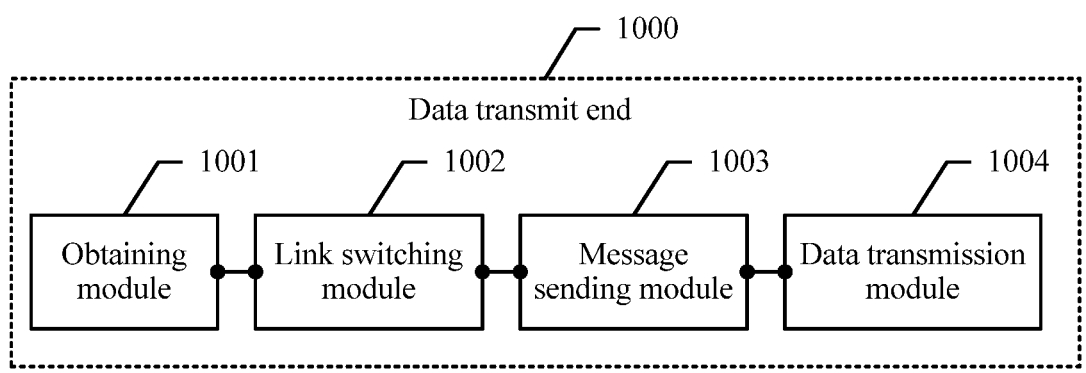
FIG. 10-a

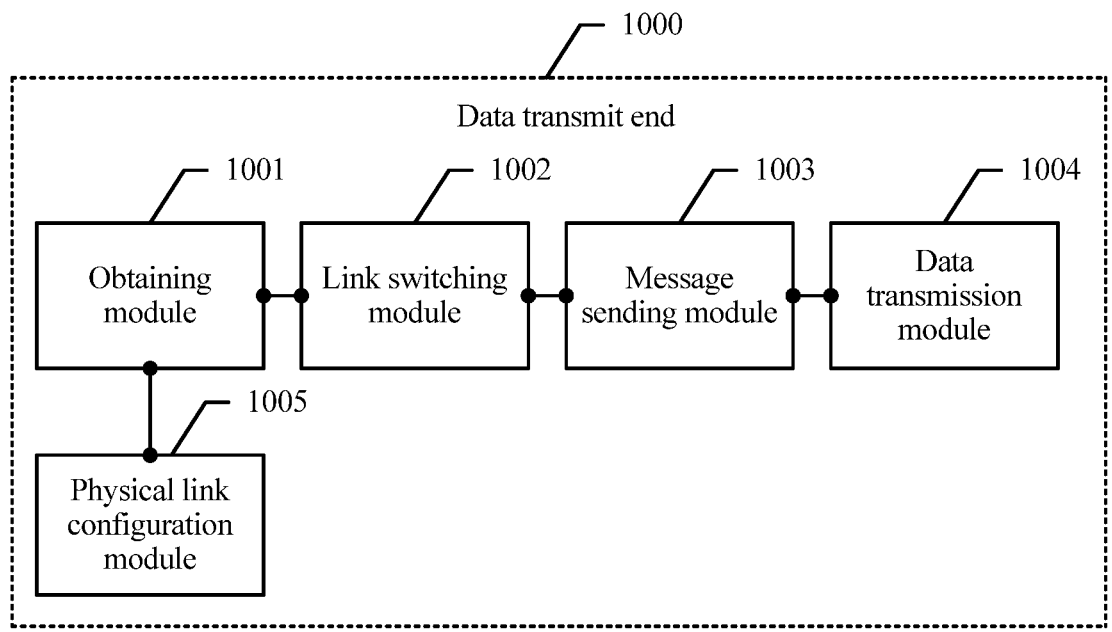
FIG. 10-b
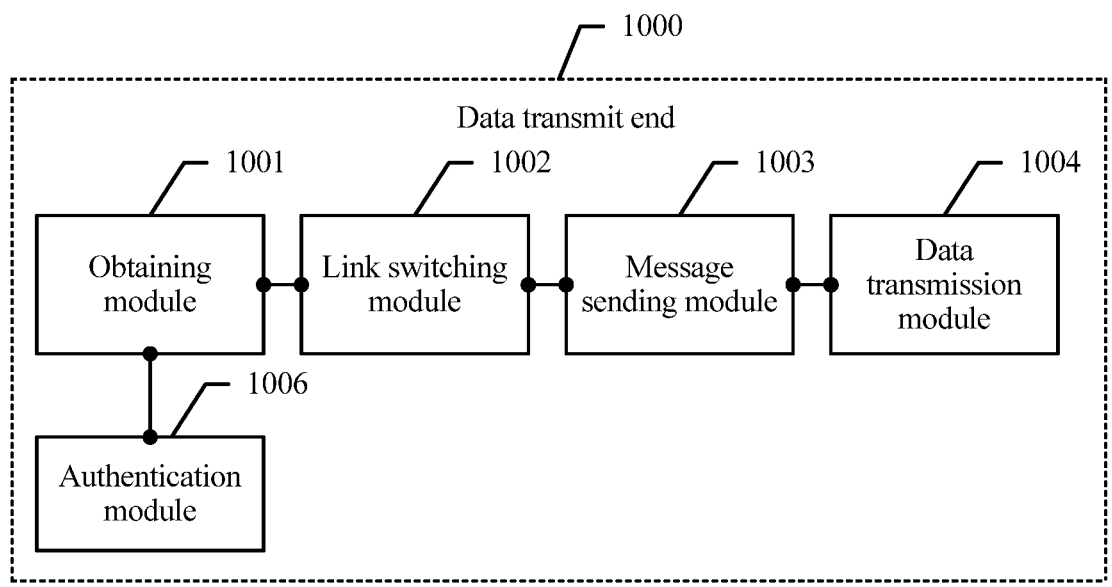
FIG. 10-c

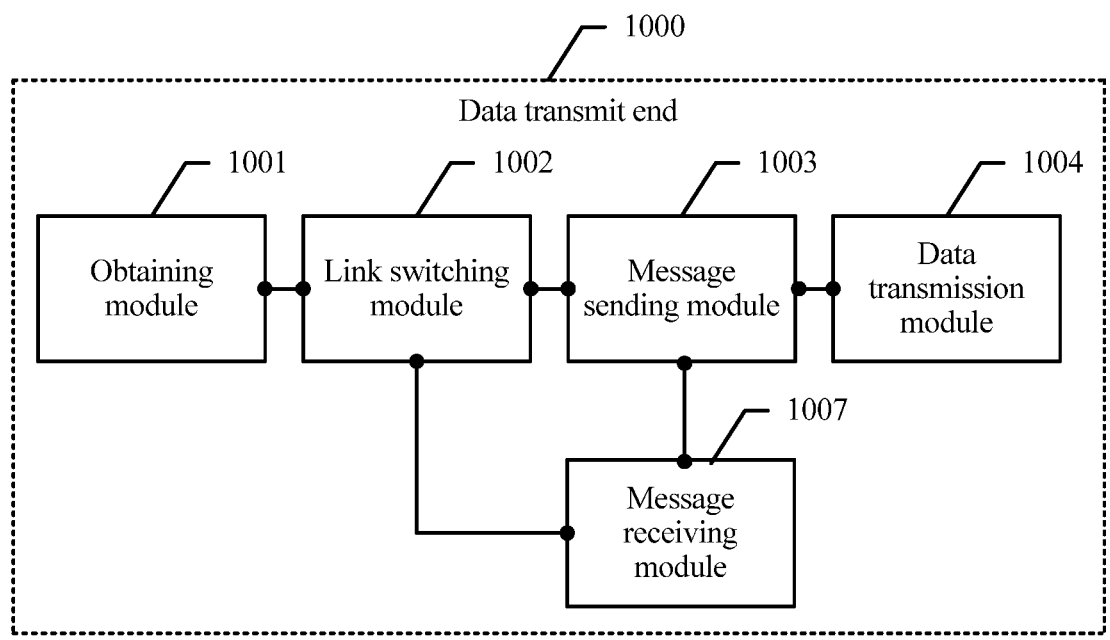
FIG. 10-d
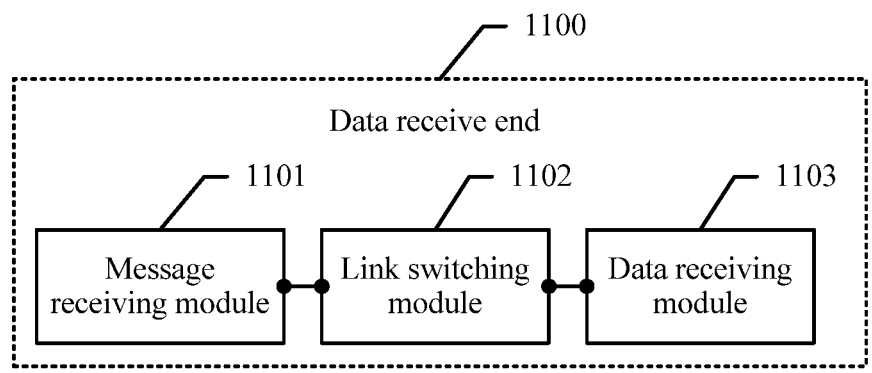
FIG. 11-a

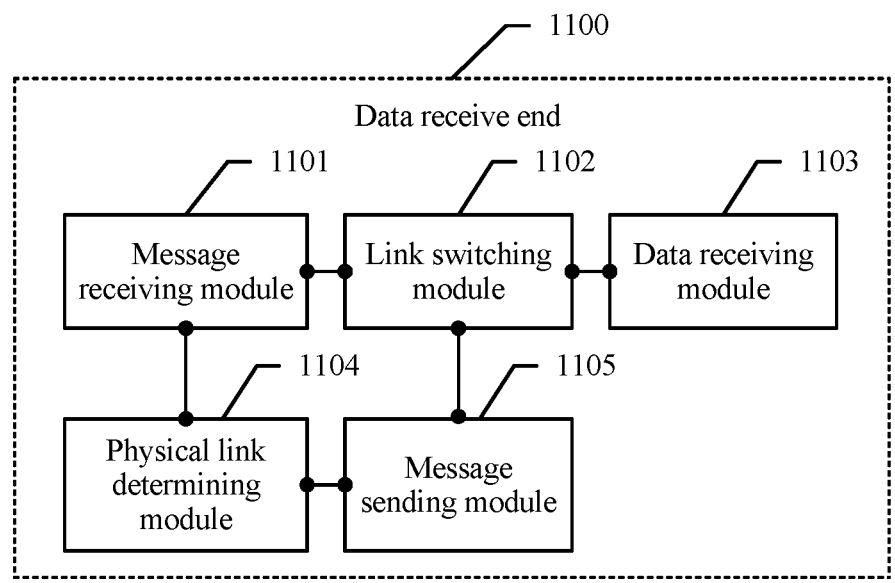
FIG. 11-b
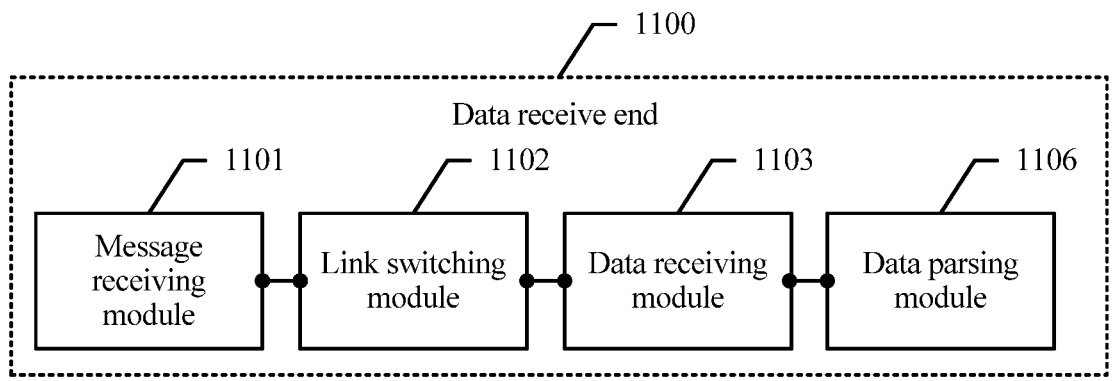
FIG. 11-c

DATA SENDING METHOD, DATA RECEIVING METHOD, DATA TRANSMIT END, AND DATA RECEIVE END

CROSS-REFERENCE TO RELATED APPLICATIONS

This application is a National Stage of International Application No. PCT/CN2017/074892, filed on Feb. 25, 2017, which claims priority to Chinese Patent Application No. 201611236957.1, filed on Dec. 28, 2016. Both of the aforementioned applications are hereby incorporated by reference in their entireties.

TECHNICAL FIELD

Embodiments of this application relate to the communications field, and in particular, to a data sending method, a data receiving method, a data transmit end, and a data receive end.

BACKGROUND

Data transmission is one of most commonly used functions of a terminal. For a user, different transmission content or objects may have different transmission requirements, and therefore, different transmission modes are generated.

To meet the transmission requirements of the user, a current terminal may provide a plurality of physical links for the user to use, but different physical links have different features and usage scenes. The terminal has many different data transmission modes. For example, the terminal shares a file through classic Bluetooth, transmits a file in a direct connection manner through Wireless Fidelity (Wireless Fidelity, WiFi), and shares a file by using a third-party network disk application.

In the prior art, a user operating the terminal needs to select different transmission physical links for use. For example, when determining to use classic Bluetooth, the user needs to manually configure a Bluetooth link, and when determining to use WiFi, the user needs to manually configure a WiFi link. Therefore, in the prior art, when the user performs data transmission, the user needs to know features and scenarios of various data transmission modes, and then selects one of the plurality of transmission modes. However, this operation is difficult for a common user. To be specific, different physical links are isolated from each other, and the user cannot fully know features and operation manners of various physical links. Therefore, the user cannot use a plurality of available physical links in the terminal. Consequently, data transmission fails or data transmission efficiency is reduced.

SUMMARY

Embodiments of this application provide a data sending method, a data receiving method, a data transmit end, and a data receive end, to resolve a problem of a data transmission failure caused because a user cannot correctly select a physical link, and to improve data transmission efficiency.

According to a first aspect, an embodiment of this application provides a data sending method, includes: obtaining a transmission path used for data transmission, where the transmission path currently uses a first physical link group to transmit data, and the first physical link group includes at least one physical link; switching, based on a preconfigured link switching policy and transmission information of the transmission path, a physical link used by the transmission path from the first physical link group to a second physical link group, where the second physical link group includes at least one physical link, the second physical link group and the first physical link group have one or more same physical links, or the second physical link group and the first physical link group have no same physical link, and the transmission information includes information obtained by monitoring the first physical link group used by the transmission path; sending a first link switching notification message to a data receive end, where the first link switching notification message includes information indicating that the physical link used by the transmission path is switched from the first physical link group to the second physical link group; and continuing transmitting the data through a transmission path that uses the second physical link group. In this embodiment of this application, a data transmit end may switch, based on the preconfigured link switching policy and the transmission information of the transmission path, the physical link used by the transmission path from the first physical link group to the second physical link group. Therefore, the physical link may be automatically and dynamically adjusted for the data that needs to be transmitted, without requiring a user to determine a to-be-used physical link and to pay attention to various physical links, so as to resolve a problem of a data transmission failure caused because the user cannot correctly select a physical link, and to improve data transmission efficiency.

In a possible design, the switching, based on a preconfigured link switching policy and transmission information of the transmission path, the first physical link group used by the transmission path to a second physical link group includes: when the transmission path uses the first physical link group to transmit the data, collecting statistics about quality of service QoS of the first physical link group used by the transmission path, to obtain QoS information; and switching, based on a QoS policy in the link switching policy and the QoS information, the physical link used by the transmission path from the first physical link group to the second physical link group. In this embodiment of this application, the user does not need to manually change the physical link, so that automatic switching of the physical link on the data transmit end side is implemented, and QoS of data transmission is improved.

In a possible design, the switching, based on a QoS policy in the link switching policy and the QoS information, the physical link used by the transmission path from the first physical link group to the second physical link group includes: collecting, based on the QoS policy in the link switching policy, statistics about QoS of the second physical link group of a data transmit end that configures the transmission path, to obtain QoS information of the second physical link group; and switching, based on the QoS policy in the link switching policy and the QoS information of the second physical link group, the physical link used by the transmission path from the first physical link group to the second physical link group. In this embodiment of this application, when the data transmit end switches the physical link, the data transmit end may monitor not only the QoS of the first physical link group but also the QoS of the second physical link group, to determine whether the QoS information of the second physical link group meets a requirement of the QoS policy. When the QoS information of the second physical link group meets the requirement of the QoS policy, the physical link used by the transmission path is switched from the first physical link group to the second physical link group, to ensure QoS when the switched second physical link group is used to transmit the data.

In a possible design, the switching, based on a preconfigured link switching policy and transmission information of the transmission path, the physical link used by the transmission path from the first physical link group to a second physical link group includes: when the transmission path uses the first physical link group to transmit the data, monitoring a transmission rate of the first physical link group used by the transmission path, to obtain load information; and switching, based on a load policy in the link switching policy and the load information, the physical link used by the transmission path from the first physical link group to the second physical link group. In this embodiment of this application, the user does not need to manually change the physical link, so that automatic switching of the physical link on the data transmit end side is implemented, and data transmission efficiency is improved.

In a possible design, the switching, based on a load policy in the link switching policy and the load information, the physical link used by the transmission path from the first physical link group to the second physical link group includes: collecting, based on the load policy in the link switching policy, statistics about load of the second physical link group of a data transmit end that configures the transmission path, to obtain load information of the second physical link group; and switching, based on the load policy in the link switching policy and the load information of the second physical link group, the physical link used by the transmission path from the first physical link group to the second physical link group. In this embodiment of this application, when the data transmit end switches the physical link, the data transmit end may monitor not only load of the first physical link group but also the load of the second physical link group, to determine whether the load information of the second physical link group meets a requirement of the load policy. When the load information of the second physical link group meets the requirement of the load policy, the physical link used by the transmission path is switched from the first physical link group to the second physical link group, to ensure load when the switched second physical link group is used to transmit the data.

In a possible design, the switching, based on a preconfigured link switching policy and transmission information of the transmission path, the physical link used by the transmission path from the first physical link group to a second physical link group includes: when the transmission path uses the first physical link group to transmit the data, obtaining path availability information based on a quantity of links and a quantity of paths that are used by a data transmit end that configures the transmission path, where the path availability information includes information about whether the transmission path can continue to use the first physical link group; and switching, based on the link switching policy and the path availability information, the physical link used by the transmission path from the first physical link group to the second physical link group. In this embodiment of this application, the data transmit end may monitor the quantity of links and the quantity of paths that are used by the data transmit end corresponding to the transmission path, to be specific, monitor the quantity of links and the quantity of paths that are used by the data transmit end, to obtain the path availability information. The data transmit end may switch, based on the link switching policy and the path availability information, the physical link used by the transmission path from the first physical link group to the second physical link group, to avoid a link switching failure caused by a link limitation and a path limitation of the data transmit end.

In a possible design, before the obtaining a transmission path used for data transmission, the method further includes: obtaining a content type and a data volume of the data, and configuring the first physical link group for the transmission path based on the content type and the data volume. The data transmit end may determine, based on the content type and the data volume of the data that needs to be transmitted, the first physical link group that can be used by the transmission path, so that the first physical link group configured for the transmission path is applicable to the data that needs to be transmitted, so as to improve data transmission efficiency.

In a possible design, the method further includes: obtaining authentication information of a first physical link in the first physical link group; and if authentication of the first physical link succeeds, determining, based on the authentication information of the first physical link, that authentication of the physical link in the second physical link group between a data transmit end that configures the transmission path and the data receive end succeeds. When a physical link is established between the data transmit end and the data receive end, if there are a plurality of physical links, and one physical link or some physical links need to be configured and authenticated before use, different physical links of a same data transmit end may share pairing or authentication information, thereby reducing overheads of separately authenticating different physical links between the data transmit end and the data receive end.

In a possible design, the continuing transmitting the data through a transmission path that uses the second physical link group includes: encapsulating the data by using a transport layer protocol corresponding to the physical link in the first physical link group; and continuing transmitting, through the transmission path that uses the second physical link group, the data that is encapsulated by using the transport layer protocol. The data transmit end may further implement transmission across physical layers performed by using different application side protocols. For example, the data transmit end encapsulates the data by using the transport layer protocol corresponding to the physical link in the first physical link group, and continues transmitting, through the transmission path that uses the second physical link group, the data that is encapsulated by using the transport layer protocol. The data transmit end may reuse an existing transport layer protocol to implement data transmission across physical links.

In a possible design, after the sending a first link switching notification message to a data receive end, the method further includes: receiving a first link switching feedback message sent by the data receive end; and if the first link switching feedback message indicates that the data receive end cannot switch the first physical link group to the second physical link group, switching, based on the preconfigured link switching policy and the transmission information of the transmission path, the physical link used by the transmission path from the first physical link group to a third physical link group, where the third physical link group includes at least one physical link, and the third physical link group and the first physical link group have one or more same physical links, or each physical link of the third physical link group is different from that of the first physical link group; and sending a second link switching notification message to the data receive end; or if the first link switching feedback message indicates that the data receive end successfully switches the first physical link group to the second physical link group, triggering execution of the following step: continuing transmitting the data through the transmission path that uses the second physical link group. The physical link is switched between the data transmit end and the data receive end in a negotiation manner, so that both the data transmit end and the data receive end can successfully switch the physical link, and successful switching of the physical link between the data transmit end and the data receive end is ensured.

In a possible design, when the first physical link group includes a first physical link, the switching, based on a preconfigured link switching policy and transmission information of the transmission path, a physical link used by the transmission path from the first physical link group to a second physical link group includes: switching, based on the preconfigured link switching policy and the transmission information of the transmission path, the physical link used by the transmission path from the first physical link to a second physical link; or in addition to the first physical link used by the transmission path, adding a second physical link based on the preconfigured link switching policy and the transmission information of the transmission path, where the second physical link belongs to the second physical link group. When a current transmission path of the data transmit end uses the first physical link, the data transmit end may change the first physical link to the second physical link based on the link switching policy and the transmission information of the transmission path, or add the second physical link when the data transmit end continues to use the first physical link. The user does not need to manually change the physical link, so that automatic switching of the physical link on the data transmit end side is implemented, and data transmission efficiency is improved.

According to a second aspect, an embodiment of this application further provides a data receiving method, including: receiving a first link switching notification message sent by a data transmit end, where the first link switching notification message includes information indicating that a physical link used by a transmission path of the data transmit end is switched from a first physical link group to a second physical link group, the transmission path currently uses the first physical link group to transmit data, the first physical link group includes at least one physical link, the second physical link group includes at least one physical link, and the second physical link group and the first physical link group have one or more same physical links, or the second physical link group and the first physical link group have no same physical link; switching a physical link used by a transmission path of a data receive end from the first physical link group to the second physical link group; and continuing receiving the data through a transmission path that uses the second physical link group. In this embodiment of this application, the data receive end may switch, based on the first link switching notification message sent by the data transmit end, the physical link used by the transmission path from the first physical link group to the second physical link group. Therefore, the physical link may be automatically and dynamically adjusted for the data that needs to be transmitted, without requiring a user to determine a to-be-used physical link and to pay attention to various physical links, so as to resolve a problem of a data transmission failure caused because the user cannot correctly select a physical link, and to improve data transmission efficiency.

In a possible design, after the receiving a first link switching notification message sent by a data transmit end, the method further includes: determining whether the data receive end can switch the first physical link group to the second physical link group; and if the data receive end cannot switch the first physical link group to the second physical link group, sending a first link switching feedback message to the data transmit end, where the first link switching feedback message includes information indicating that the data receive end cannot switch the first physical link group to the second physical link group. The physical link is switched between the data transmit end and the data receive end in a negotiation manner, so that both the data transmit end and the data receive end can successfully switch the physical link, and successful switching of the physical link between the data transmit end and the data receive end is ensured.

In a possible design, after the receiving a first link switching notification message sent by a data transmit end, the method further includes: determining whether the data receive end can switch the first physical link group to the second physical link group; and if the data receive end can switch the first physical link group to the second physical link group, after the physical link used by the transmission path of the data receive end is switched from the first physical link group to the second physical link group, sending a first link switching feedback message to the data transmit end, where the first link switching feedback message includes information indicating that the data receive end successfully switches the first physical link group to the second physical link group. The physical link is switched between the data transmit end and the data receive end in a negotiation manner, so that both the data transmit end and the data receive end can successfully switch the physical link, and successful switching of the physical link between the data transmit end and the data receive end is ensured.

In a possible design, after the continuing receiving the data through a transmission path that uses the second physical link group, the method further includes: decapsulating the data by using a transport layer protocol corresponding to the physical link in the first physical link group. The data receive end may support transmission across physical layers performed by using different application side protocols. For example, the data transmit end encapsulates the data by using the transport layer protocol corresponding to the physical link in the first physical link group, and continues transmitting, through a transmission path that uses the second physical link group, the data that is encapsulated by using the transport layer protocol. The data receive end may decapsulate the received data, to support data transmission across physical layers.

In a possible design, when the first physical link group includes a first physical link, the switching a physical link used by a transmission path of a data receive end from the first physical link group to the second physical link group includes: switching, based on the first link switching notification message, the physical link used by the transmission path of the data receive end from the first physical link to a second physical link; or in addition to the first physical link used by the transmission path of the data receive end, adding a second physical link based on the first link switching notification message, where the second physical link belongs to the second physical link group. When a current transmission path of the data receive end uses the first physical link, the data receive end may change the first physical link to the second physical link, or add the second physical link when the data receive end continues to use the first physical link. The user does not need to manually change the physical link, so that automatic switching of the physical link on the data transmit end side is implemented, and data transmission efficiency is improved.

According to a third aspect, an embodiment of this application further provides a data transmit end, includes: an obtaining module, configured to obtain a transmission path used for data transmission, where the transmission path currently uses a first physical link group to transmit data, and the first physical link group includes at least one physical link; a link switching module, configured to switch, based on a preconfigured link switching policy and transmission information of the transmission path, a physical link used by the transmission path from the first physical link group to a second physical link group, where the second physical link group includes at least one physical link, the second physical link group and the first physical link group have one or more same physical links, or the second physical link group and the first physical link group have no same physical link, and the transmission information includes information obtained by monitoring the first physical link group used by the transmission path; a message sending module, configured to send a first link switching notification message to a data receive end, where the first link switching notification message includes information indicating that the physical link used by the transmission path is switched from the first physical link group to the second physical link group; and a data transmission module, configured to continue transmitting the data through a transmission path that uses the second physical link group.

In the third aspect of this application, a composition module of the data transmit end may further perform the steps described in the first aspect and the various possible implementations. For details, refer to the descriptions in the first aspect and the various possible implementations.

According to a fourth aspect, an embodiment of this application further provides a data receive end, including: a message receiving module, configured to receive a first link switching notification message sent by a data transmit end, where the first link switching notification message includes information indicating that a physical link used by a transmission path of the data transmit end is switched from a first physical link group to a second physical link group, the transmission path currently uses the first physical link group to transmit data, the first physical link group includes at least one physical link, the second physical link group includes at least one physical link, and the second physical link group and the first physical link group have one or more same physical links, or the second physical link group and the first physical link group have no same physical link; a link switching module, configured to switch a physical link used by a transmission path of the data receive end from the first physical link group to the second physical link group; and a data receiving module, configured to continue receiving the data through a transmission path that uses the second physical link group. In this embodiment of this application, the data receive end may switch, based on the first link switching notification message sent by the data transmit end, the physical link used by the transmission path from the first physical link group to the second physical link group. Therefore, the physical link may be automatically and dynamically adjusted for the data that needs to be transmitted, without requiring a user to determine a to-be-used physical link and to pay attention to various physical links, so as to resolve a problem of a data transmission failure caused because the user cannot correctly select a physical link, and to improve data transmission efficiency.

In the fourth aspect of this application, a composition module of the data receive end may further perform the steps described in the second aspect and the various possible implementations. For details, refer to the descriptions in the second aspect and the various possible implementations.

According to a fifth aspect, an embodiment of this application further provides a data transmit end, including: at least one processor and a memory, where the memory is configured to store a program, an instruction, and data, and the processor invokes the program, the instruction, and the data in the memory, to perform the following steps: obtaining a transmission path used for data transmission, where the transmission path currently uses a first physical link group to transmit data, and the first physical link group includes at least one physical link; switching, based on a preconfigured link switching policy and transmission information of the transmission path, a physical link used by the transmission path from the first physical link group to a second physical link group, where the second physical link group includes at least one physical link, the second physical link group and the first physical link group have one or more same physical links, or the second physical link group and the first physical link group have no same physical link, and the transmission information includes information obtained by monitoring the first physical link group used by the transmission path; sending a first link switching notification message to a data receive end, where the first link switching notification message includes information indicating that the physical link used by the transmission path is switched from the first physical link group to the second physical link group; and continuing transmitting the data through a transmission path that uses the second physical link group. In this embodiment of this application, the data transmit end may switch, based on the preconfigured link switching policy and the transmission information of the transmission path, the physical link used by the transmission path from the first physical link group to the second physical link group. Therefore, the physical link may be automatically and dynamically adjusted for the data that needs to be transmitted, without requiring a user to determine a to-be-used physical link and to pay attention to various physical links, so as to resolve a problem of a data transmission failure caused because the user cannot correctly select a physical link, and to improve data transmission efficiency.

In the fifth aspect of this application, the processor in the data transmit end may further perform the steps described in the first aspect and the various possible implementations. For details, refer to the descriptions in the first aspect and the various possible implementations.

According to a sixth aspect, an embodiment of this application further provides a data receive end, including: at least one processor and a memory, where the memory is configured to store a program, an instruction, and data, and the processor invokes the program, the instruction, and the data in the memory, to perform the following steps: receiving a first link switching notification message sent by a data transmit end, where the first link switching notification message includes information indicating that a physical link used by a transmission path of the data transmit end is switched from a first physical link group to a second physical link group, the transmission path currently uses the first physical link group to transmit data, the first physical link group includes at least one physical link, the second physical link group includes at least one physical link, and the second physical link group and the first physical link group have one or more same physical links, or the second physical link group and the first physical link group have no same physical link; switching a physical link used by a transmission path of the data receive end from the first physical link group to the second physical link group; and continuing receiving the data through a transmission path that uses the second physical link group. In this embodiment of this application, the data receive end may switch, based on the first link switching notification message sent by the data transmit end, the physical link used by the transmission path from the first physical link group to the second physical link group. Therefore, the physical link may be automatically and dynamically adjusted for the data that needs to be transmitted, without requiring a user to determine a to-be-used physical link and to pay attention to various physical links, so as to resolve a problem of a data transmission failure caused because the user cannot correctly select a physical link, and to improve data transmission efficiency.

In the sixth aspect of this application, the processor in the data receive end may further perform the steps described in the second aspect and the various possible implementations. For details, refer to the descriptions in the second aspect and the various possible implementations.

According to a seventh aspect of this application, a computer readable storage medium is provided. The computer readable storage medium stores an instruction. When the instruction is run on a computer, the computer performs the method in the foregoing aspects.

According to an eighth aspect of this application, a computer program product that includes an instruction is provided. When the instruction is run on a computer, the computer performs the method in the foregoing aspects.

BRIEF DESCRIPTION OF THE DRAWINGS

The following describes the embodiments of this application in detail with reference to the accompanying drawings.

FIG. 9 is a schematic diagram of a result of data transmission across physical links that is displayed on a UI of a mobile phone according to this application;

FIG. 10-a is a schematic diagram of structural composition of a possible data transmit end according to this application;

FIG. 10-b is a schematic diagram of structural composition of another possible data transmit end according to this application;

FIG. 10-c is a schematic diagram of structural composition of another possible data transmit end according to this application;

FIG. 10-d is a schematic diagram of structural composition of another possible data transmit end according to this application;

FIG. 11-a is a schematic diagram of structural composition of a possible data receive end according to this application;

FIG. 11-b is a schematic diagram of structural composition of another possible data receive end according to this application;

FIG. 11-c is a schematic diagram of structural composition of another possible data receive end according to this application;

DETAILED DESCRIPTION OF ILLUSTRATIVE EMBODIMENTS

Network architectures and service scenarios described in the embodiments of this application aim to more clearly describe the technical solutions in the embodiments of this application, but are not intended to limit the technical solutions provided in the embodiments of this application. A person of ordinary skill in the art may know that as the network architectures evolve and a new service scenario emerges, the technical solutions provided in the embodiments of this application further apply to a similar technical problem.

Figure 1:
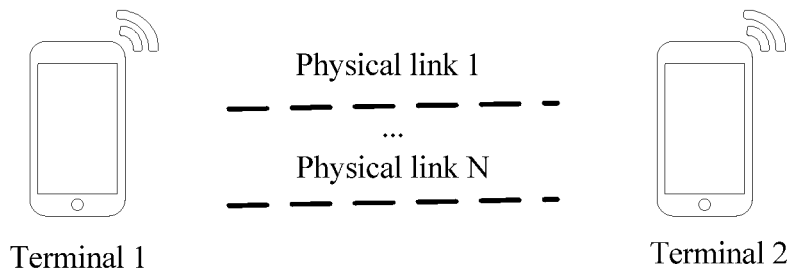
FIG. 1 is a schematic diagram of a possible application scenario according to this application.

The technologies described in this application are applicable to data transmission performed by a terminal, and the terminal in this application includes two ends of data transmission: a data transmit end and a data receive end. The terminal in this application may include various handheld devices, in-vehicle devices, wearable devices, or computing devices that have a wireless communication function, or other processing devices connected to a wireless modem, and user equipment (User Equipment, UE), a mobile station (Mobile station, MS), a terminal (terminal), a terminal device (Terminal Equipment), and the like that are in various forms. For ease of description, in this application, the devices mentioned above are collectively referred to as terminals. In this application, a plurality of physical links (Physical Link, PL) may be established between the two ends of data transmission, and both the data transmit end and the data receive end can dynamically switch physical links without requiring a user to select a physical link. For example, referring to FIG. 1, FIG. 1 is a schematic diagram of a possible application scenario according to this application. A terminal 1 is a data transmit end, and a terminal 2 is a data receive end. N physical links are established between the terminal 1 and the terminal 2. N is an integer greater than or equal to 2.

The physical link in the embodiments of this application may be a near field communication manner such as a WiFi link, a Bluetooth basic rate (Basic Rate, BR)/enhanced data rate (Enhanced Data Rate, EDR) link, a Bluetooth low energy (Bluetooth Low Energy, BLE) link, and a near field communication (Near Field Communication, NFC) link, or may be a remote communication manner such as a mobile network link. The WiFi link is used for high-speed transmission of a large volume of data and network transmission, and is characterized by high power consumption. For example, the WiFi link may be further divided into a WiFi station (Station) link, a WiFi peer-to-peer (Peer to Peer, P2P) link, and a WiFi access point (Access Point, AP) link. The WiFi station link uses a mode of accessing a network by connecting to a router. The WiFi P2P link uses a WiFi direct connection mode. The WiFi AP link uses a mode of establishing an AP for WiFi. The Bluetooth BR/EDR link is classic Bluetooth, is used for a low-speed short-distance long-time connection, and is characterized by low power consumption. The Bluetooth BLE link is used for a low-speed short-distance short-time connection, and is characterized by extremely low power consumption. The NFC link is used for proximity security transmission. The mobile network link is used for remote data transmission, but an operator needs to be paid for the mobile network link.

In the embodiments of this application, in order to complete data transmission between the data transmit end and the data receive end, corresponding transmission paths (transmission path, TP) are respectively configured for different data services. The transmission path is a virtual link dedicated to the data service. In the embodiments of this application, the transmission path may use at least one physical link to complete data transmission. For example, some transmission paths may use one physical link to perform data transmission, and some transmission paths may use a plurality of physical links to complete data transmission. The following separately describes a data transmission process provided in the embodiments of this application from a perspective of the data transmit end and from a perspective of the data receive end.

Figure 2:
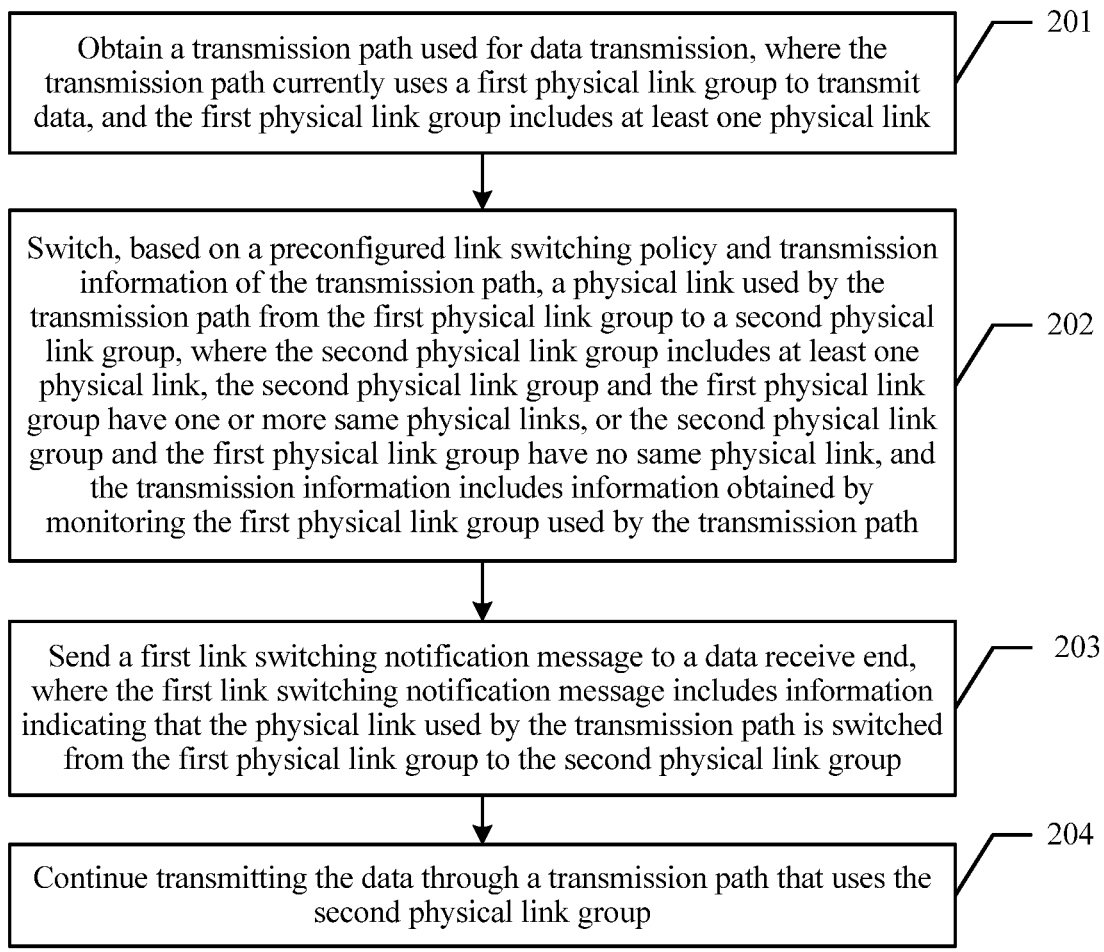
FIG. 2 is a schematic block flowchart of a possible data sending method according to this application.

A data sending method according to an embodiment of this application is first described from a perspective of a data transmit end. Referring to FIG. 2, the data sending method may include the following steps.

201. Obtain a transmission path used for data transmission, where the transmission path currently uses a first physical link group to transmit data, and the first physical link group includes at least one physical link.

In this embodiment of this application, the data transmit end may use the transmission path to transmit the data to a data receive end. The transmission path is a virtual link dedicated to a data service. The transmission path currently uses the first physical link group to transmit the data. The data transmitted at the data transmit end is a specific type of data service. For example, the data may be streaming media data such as screen sharing and video live broadcast, or may be transmitted file data, an SMS message that requires secure and reliable transmission, voice data that requires timeliness, or the like. The first physical link group currently used by the transmission path of the data transmit end may be understood as a group of physical links currently used by the transmission path when the data transmit end obtains the transmission path. The first physical link group may include one physical link, or may include a plurality of physical links. For example, the physical link in the first physical link group may be the foregoing WiFi link, classic Bluetooth link, NFC link, mobile network link, or the like. This is not limited herein.

In an example of this application, before the obtaining a transmission path used for data transmission in step 201, the data sending method provided in this embodiment of this application may further include the following steps:

A1. Obtain a content type and a data volume of the data.

A2. Configure the first physical link group for the transmission path based on the content type and the data volume.

The data transmit end may determine, based on the content type and the data volume of the data that needs to be transmitted, the first physical link group that can be used by the transmission path, so that the first physical link group configured for the transmission path is applicable to the data that needs to be transmitted, so as to improve data transmission efficiency. Specifically, the content type is data content of a data service. For example, the data may be streaming media data such as screen sharing and video live broadcast, or may be transmitted file data, an SMS message that requires secure and reliable transmission, voice data that requires timeliness, or the like. The data volume is transmission load of to-be-transmitted data, and is usually represented by using byte (Byte), bit (bit), megabit (M), or the like. For example, the data transmit end may configure one physical link for the transmission path, or may simultaneously configure more than two physical links for the transmission path. A specific configuration manner depends on the content type and the data volume of the data that needs to be transmitted, load of the configured physical link, and the like. This is not limited herein.

Figure 3:
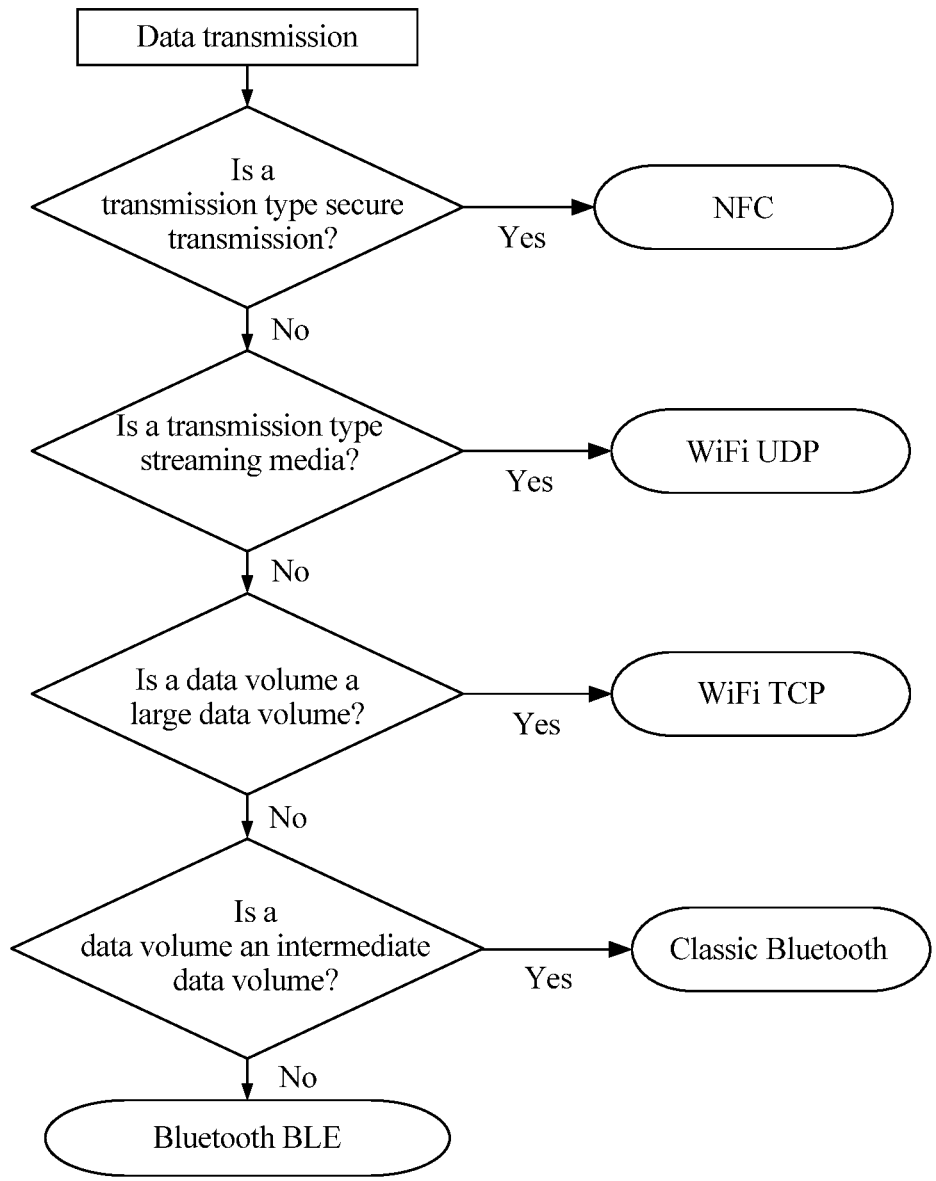
FIG. 3 is a schematic diagram of a possible physical link configuration procedure according to this application.

In an example of this application, referring to FIG. 3, FIG. 3 is a schematic diagram of a possible physical link configuration procedure according to this application. A user does not need to pay more attention to various physical links, and the data transmit end may automatically configure a transmission path based on a data service transmitted by the user. FIG. 3 shows a schematic diagram of selecting and switching a physical link based on features of various data services. When data transmission starts, whether secure transmission is required and two terminals are in close proximity is determined. If yes, an NFC link may be configured for the transmission path. NFC transmission requires users to get one device close to the other device, so that a process of authorizing the users is added, and security is ensured. If it is determined, before data transmission starts, that a file with a large volume of data is to be transmitted, a transmission mode of a WiFi link is preferably selected. In this case, whether a WiFi Station link, a WiFi P2P link, or a WiFi AP link is used may be determined based on conditions such as whether current WiFi frequency bands of the users are in a same network segment, and capability limitations of the devices. In addition, a transport layer protocol may be further selected based on a feature of data content. For example, when transmission load is streaming media data such as screen sharing and video live broadcast, a WiFi user datagram protocol (User Datagram Protocol, UDP) link may be used to reduce a delay. When transmission load is scenarios such as file transmission, image sharing, and application sharing, a WiFi transmission control protocol (Transmission Control Protocol, TCP) link needs to be used to ensure reliability of file transmission. If transmission load is a small data volume or a data volume of a data service cannot be determined, a Bluetooth link may be used for transmission. When transmission load is not a large data volume, whether the transmission load is an intermediate data volume may be determined, to determine a physical link configured for the transmission path. For example, when a volume of data that needs to be transmitted is the intermediate data volume, the data may be transmitted by using a mesh topology structure of classic Bluetooth, and each data transmit end may be connected to a maximum of seven terminals. This is applicable to a one-to-many transmission scenario. If a volume of data that needs to be transmitted is extremely small, a Bluetooth low energy (Bluetooth Low Energy, BLE) link is configured for the transmission path. The Bluetooth BLE link is characterized by fast link establishment and extremely low power consumption. This is applicable to transmitting a small volume of data. A size of the large data volume and a size of the intermediate data volume may be set based on a specific scenario. This is merely used as an example for description herein.

202. Switch, based on a preconfigured link switching policy and transmission information of the transmission path, a physical link used by the transmission path from the first physical link group to a second physical link group, where the second physical link group includes at least one physical link, the second physical link group and the first physical link group have one or more same physical links, or the second physical link group and the first physical link group have no same physical link, and the transmission information includes information obtained by monitoring the first physical link group used by the transmission path.

In this embodiment of this application, the transmission path of the data transmit end currently uses the first physical link group, and whether the physical link used by the transmission path is switched may be determined based on the link switching policy and the transmission information of the transmission path. The transmission information may include the information obtained by monitoring the first physical link group used by the transmission path. The transmission information is obtained by monitoring the first physical link group used by the transmission path. Information that needs to be monitored when the transmission path uses the first physical link group to transmit the data may be determined based on an application scenario. This is not limited herein. The data transmit end may determine, based on whether the transmission information of the transmission path matches the link switching policy, whether to switch the physical link used by the transmission path. The link switching policy may be set based on an application scenario. When the transmission information of the transmission path meets the link switching policy, the physical link of the transmission path is automatically switched.

In this embodiment of this application, a switched physical link of the transmission path of the data transmit end is defined as the second physical link group. The second physical link group includes at least one physical link. The second physical link group and the first physical link group have one or more same physical links, or the second physical link group and the first physical link group have no same physical link. For example, if the first physical link group includes a physical link 1 and a physical link 2, the second physical link group may include a physical link 3 and a physical link 4, or the second physical link group may include the physical link 2 and the physical link 3. To be specific, some same physical links may exist in the first physical link group and the second physical link group, or each physical link of the first physical link group is different from that of the second physical link group. Specific implementation depends on a selected link switching policy and monitored transmission information in an actual scenario. This is not limited herein.

For example, a unified transmission operation interface and a unified interface are provided for a user, a physical link is selected based on a content type and a data volume of data to be transmitted by the user, and one or more physical links may be automatically switched for a transmission path based on a matching status of transmission information of the transmission path and a link switching policy without requiring the user to understand features and principles of the physical links. In this embodiment of this application, different physical links may be abstracted and unified, for example, the physical links may be abstracted as NFC near field communications devices, and a developer and a user unify a control interface and an application programming interface (Application Programming Interface, API). In this embodiment of this application, different physical links may be automatically switched or combined based on capabilities or limits of two parties of data transmission, current load, and QoS. The transmission information of the transmission path and the preconfigured link switching policy are used as bases of determining whether to switch the physical link for the transmission path. The transmission information that needs to be monitored may be set based on a scenario, and a transmission information threshold for switching the physical link may be flexibly set based on the scenario. The following performs description by using an example.

In an example of this application, the switching, based on a preconfigured link switching policy and transmission information of the transmission path, the physical link used by the transmission path from the first physical link group to a second physical link group in step 202 includes:

B1. When the transmission path uses the first physical link group to transmit the data, collect statistics about quality of service (Quality of Service, QoS) of the first physical link group used by the transmission path, to obtain QoS information.

B2. Switch, based on a QoS policy in the link switching policy and the QoS information, the physical link used by the transmission path from the first physical link group to the second physical link group.

The data transmit end may monitor QoS of the transmission path, to obtain QoS information. The data transmit end may switch, based on the QoS policy in the link switching policy and the QoS information, the physical link used by the transmission path from the first physical link group to the second physical link group. The second physical link group may be the foregoing WiFi link, classic Bluetooth link, NFC link, mobile network link, or the like. This is not limited herein. For example, a QoS threshold may be set. When the QoS information of the transmission path exceeds the QoS threshold, the first physical link group is automatically switched to the second physical link group. The user does not need to manually change the physical link, so that automatic switching of the physical link on the data transmit end side is implemented, and QoS of data transmission is improved.

In another example of this application, the switching, based on a QoS policy in the link switching policy and the QoS information, the physical link used by the transmission path from the first physical link group to the second physical link group in step B2 includes:

B21. Collect, based on the QoS policy in the link switching policy, statistics about QoS of the second physical link group of a data transmit end that configures the transmission path, to obtain QoS information of the second physical link group.

B22. Switch, based on the QoS policy in the link switching policy and the QoS information of the second physical link group, the physical link used by the transmission path from the first physical link group to the second physical link group.

When the data transmit end switches the physical link, the data transmit end may monitor not only the QoS of the first physical link group but also the QoS of the second physical link group, to determine whether the QoS information of the second physical link group meets a requirement of the QoS policy. When the QoS information of the second physical link group meets the requirement of the QoS policy, the physical link used by the transmission path is switched from the first physical link group to the second physical link group, to ensure QoS when the switched second physical link group is used to transmit the data. For example, the data transmit end obtains the QoS information of the second physical link group. If the second physical link group is in an idle state, the data transmit end may switch the physical link used by the transmission path from the first physical link group to the second physical link group. If the second physical link group is transmitting other data, in other words, the second physical link group is in a busy state, the data transmit end does not switch the first physical link group, to prevent QoS of data transmission that is currently performed being affected.

In an example of this application, the switching, based on a preconfigured link switching policy and transmission information of the transmission path, the physical link used by the transmission path from the first physical link group to a second physical link group in step 202 includes:

C1. When the transmission path uses the first physical link group to transmit the data, monitor a transmission rate of the first physical link group used by the transmission path, to obtain load information.

C2. Switch, based on a load policy in the link switching policy and the load information, the physical link used by the transmission path from the first physical link group to the second physical link group.

The data transmit end may monitor a transmission rate of the transmission path, in other words, monitor transmission load of the transmission path, to obtain load information. The data transmit end may switch, based on the load policy in the link switching policy and the load information, the physical link used by the transmission path from the first physical link group to the second physical link group. For example, a load threshold may be set. When the load information of the transmission path exceeds the load threshold, the first physical link group is automatically switched to the second physical link group. The user does not need to manually change the physical link, so that automatic switching of the physical link on the data transmit end side is implemented, and data transmission efficiency is improved.

In another example of this application, the switching, based on a load policy in the link switching policy and the load information, the physical link used by the transmission path from the first physical link group to the second physical link group in step C2 includes:

C21. Collect, based on the load policy in the link switching policy, statistics about load of the second physical link group of a data transmit end that configures the transmission path, to obtain load information of the second physical link group.

C22. Switch, based on the load policy in the link switching policy and the load information of the second physical link group, the physical link used by the transmission path from the first physical link group to the second physical link group.

When the data transmit end switches the physical link, the data transmit end may monitor not only load of the first physical link group but also the load of the second physical link group, to determine whether the load information of the second physical link group meets a requirement of the load policy. When the load information of the second physical link group meets the requirement of the load policy, the physical link used by the transmission path is switched from the first physical link group to the second physical link group, to ensure load when the switched second physical link group is used to transmit the data.

Figure 4:
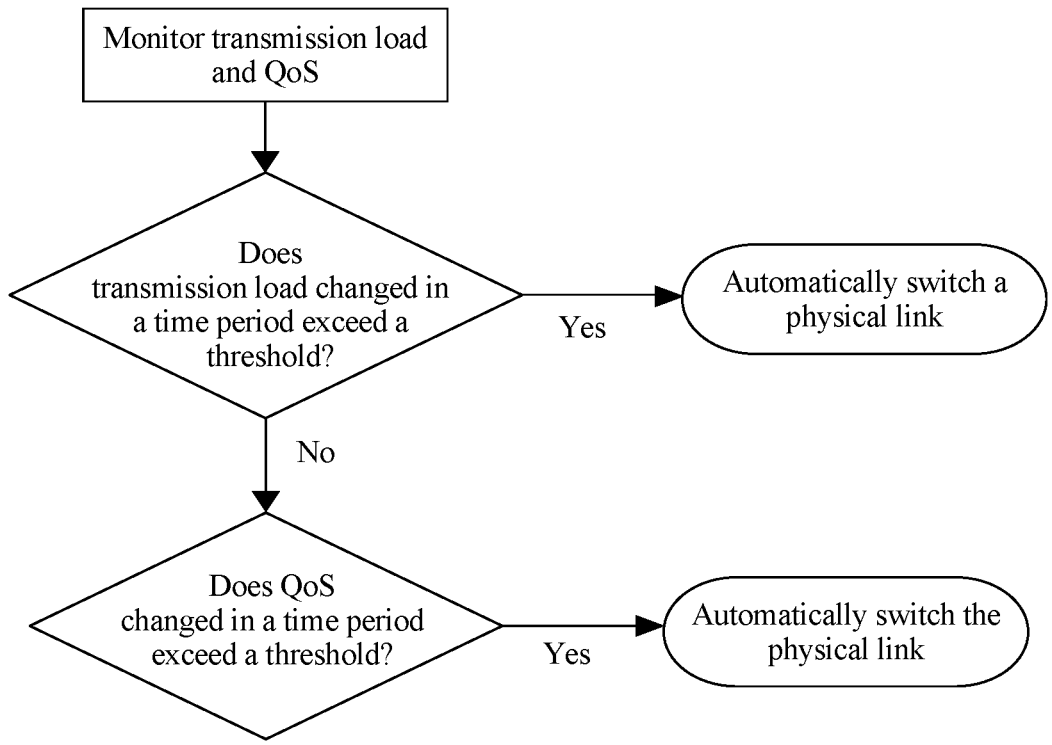
FIG. 4 is a schematic diagram of a possible physical link switching procedure according to this application.

It should be noted that in the another application scenario, referring to FIG. 4, FIG. 4 is a schematic diagram of a possible physical link switching procedure according to this application. When a transmission path uses a first physical link group to transmit data, both a transmission rate and QoS of the transmission path may be monitored to obtain load information and QoS information, and then a physical link used by the transmission path is switched from the first physical link group to a second physical link group based on a load policy in a link switching policy, the load information, and the QoS information. For example, when transmission load changed in a time period exceeds a load threshold, the physical link is automatically switched. For another example, when QoS changed in a time period exceeds a QoS threshold, the physical link is automatically switched.

For example, in a data transmission process, the data transmit end may further monitor a volume of transmitted data in real time. For example, when transmission is performed through Bluetooth BLE or Bluetooth BR, if the volume of data is suddenly increased to a threshold of a Bluetooth transmission rate, the Bluetooth link may be switched to a WiFi link for acceleration. Similarly, if it is detected in a high-speed WiFi link that a transmission rate is relatively low or there is no data transmission for a long time, the high-speed WiFi link may also be switched to various low-speed physical links to save power. For example, the high-speed WiFi link is switched to a Bluetooth link.

In an example of this application, the switching, based on a preconfigured link switching policy and transmission information of the transmission path, the physical link used by the transmission path from the first physical link group to a second physical link group in step 202 includes:

D1. When the transmission path uses the first physical link group to transmit the data, obtain path availability information based on a quantity of links and a quantity of paths that are used by a data transmit end that configures the transmission path, where the path availability information includes information about whether the transmission path can continue to use the first physical link group.

D2. Switch, based on the link switching policy and the path availability information, the physical link used by the transmission path from the first physical link group to the second physical link group.

The data transmit end may monitor the quantity of links and the quantity of paths that are used by the data transmit end corresponding to the transmission path, to be specific, monitor the quantity of links and the quantity of paths that are used by the data transmit end, to obtain the path availability information. The data transmit end may switch, based on the link switching policy and the path availability information, the physical link used by the transmission path from the first physical link group to the second physical link group, to avoid a link switching failure caused by a link limitation and a path limitation of the data transmit end. For example, a path quantity threshold and a link quantity threshold may be set. When both the quantity of paths and the quantity of links meet a requirement of the link switching policy, the first physical link group is automatically switched to the second physical link group.

In an example of this application, when the first physical link group includes a first physical link, the switching, based on a preconfigured link switching policy and transmission information of the transmission path, a physical link used by the transmission path from the first physical link group to a second physical link group in step 202 includes: switching, based on the preconfigured link switching policy and the transmission information of the transmission path, the physical link used by the transmission path from the first physical link to a second physical link; or in addition to the first physical link used by the transmission path, adding a second physical link based on the preconfigured link switching policy and the transmission information of the transmission path, where the second physical link belongs to the second physical link group. When a current transmission path of the data transmit end uses the first physical link, the data transmit end may change the first physical link to the second physical link based on the link switching policy and the transmission information of the transmission path, or add the second physical link when the data transmit end continues to use the first physical link. The user does not need to manually change the physical link, so that automatic switching of the physical link on the data transmit end side is implemented, and data transmission efficiency is improved. For example, the data transmit end currently uses a Bluetooth link to transmit data, and determines to add a WiFi link by monitoring QoS and load of the Bluetooth link. Then, the data transmit end may transmit data by using both the Bluetooth link and the WiFi link. For example, the to-be-transmitted data is divided into a data segment 1 and a data segment 2. The data transmit end may use the Bluetooth link to transmit the data segment 1, and use the WiFi link to transmit the data segment 2.

Figure 5:
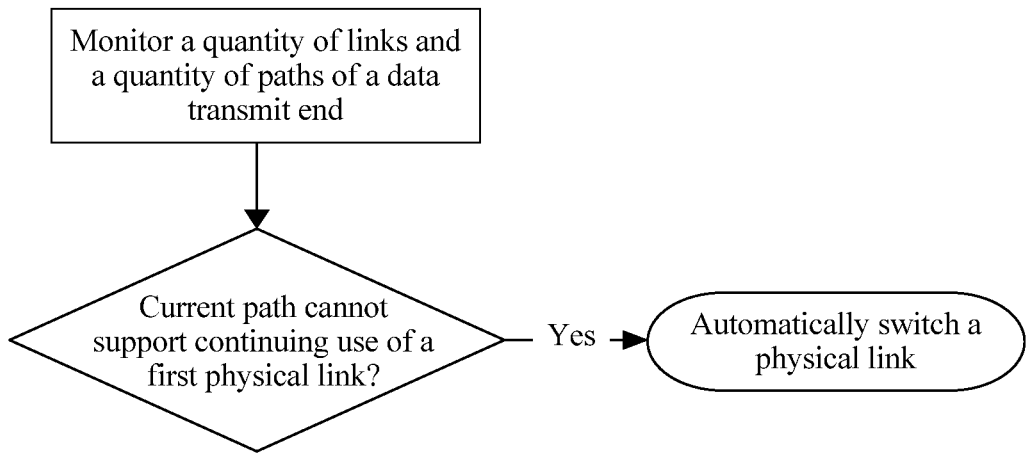
FIG. 5 is a schematic diagram of another possible physical link switching procedure according to this application.

Referring to FIG. 5, FIG. 5 is a schematic diagram of another possible physical link switching procedure according to this application. When a transmission path uses a first physical link to transmit data, a quantity of links and a quantity of paths that are used by the data transmit end may be monitored. When a current transmission link of the data transmit end cannot support continuing use of the first physical link, a physical link used by the transmission path is switched from the first physical link to a second physical link. For example, when the first physical link of the data transmit end cannot continue to be used, the physical link may be automatically switched.

In an example of this application, in addition to performing the foregoing steps, the data sending method provided in this embodiment of this application may further include the following steps:

E1. Obtain authentication information of a first physical link in the first physical link group.

E2. If authentication of the first physical link between a data transmit end and a data receive end succeeds, determine, based on the authentication information of the first physical link, that authentication of the physical link in the second physical link group between the data transmit end and the data receive end succeeds.

When a physical link is established between the data transmit end and the data receive end, if there are a plurality of physical links, and one physical link or some physical links need to be configured and authenticated before use, different physical links of a same data transmit end may share pairing or authentication information, thereby reducing overheads of separately authenticating different physical links between the data transmit end and the data receive end. In other words, pairing or authentication may be performed on one physical link, and other physical links of the data transmit end may share transmission. In an example of this application, different physical links between the data transmit end and the data receive end share authorization. For example, the data transmit end first uses Bluetooth to perform pairing, and the data transmit end may directly obtain information about WiFi links, NFC links, and Bluetooth BLE links of the data transmit end that are obtained after Bluetooth pairing, and does not need to perform authentication on the WiFi links, the NFC links, and the Bluetooth BLE links again. In another example of this application, the data transmit end may further configure switches for different physical links, to control enabling and disabling of a corresponding physical link by opening and closing a switch.

Figure 6:
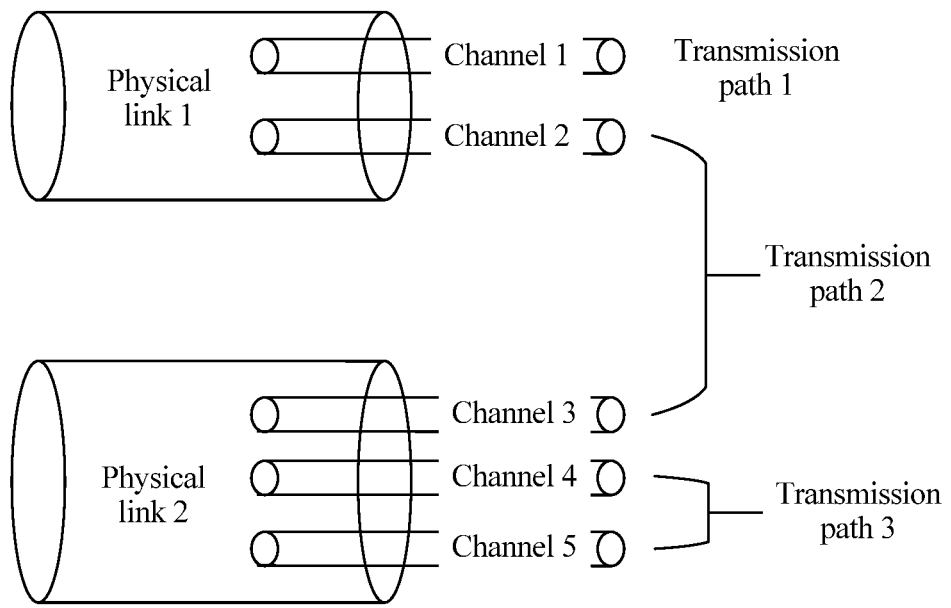
FIG. 6 is a schematic diagram of possible physical link division according to this application.

In an example of this application, the physical link may be further divided into a plurality of transmission channels based on a requirement of a physical layer protocol. Therefore, that the transmission path uses the physical link to transmit the data may be specifically the transmission path uses a transmission channel of the physical link to transmit the data. In this embodiment of this application, transmission path interfaces may be unified, and a physical link may be divided into a plurality of transmission channels, so that transmission channels across physical links may be combined to form different transmission paths, so as to implement data service transmission. For example, referring to FIG. 6, FIG. 6 is a schematic diagram of possible physical link division according to this application. For example, a physical link 1 and a physical link 2 are configured between a data transmit end and a data receive end. The physical link 1 is divided into a transmission channel 1 and a transmission channel 2, and the physical link 2 is divided into a transmission channel 3, a transmission channel 4, and a transmission channel 5. A transmission path 1 used by a data service 1 may use the transmission channel 1. A transmission path 2 used by a data service 2 may use the transmission channel 2 and the transmission channel 3. A transmission path 3 used by a data service 3 may use the transmission channel 4 and the transmission channel 5. A unified control interface may be provided for a user or developer, and the user or developer may invoke an application programming interface (Application Programming Interface, API), to shield a difference between different physical links. This is corresponding to the foregoing case in which a group of abstracted transmission path interfaces are unified. For example, a Bluetooth BLE link, a classic Bluetooth link, and a WiFi link are respectively different physical links. Service transmission such as file transmission, a wireless headset, and a projection screen needs different transmission paths. A data service requests, in a transmission path based on a need, different transmission channels to respectively carry different transmission requirements. For example, the projection screen uses a transmission channel for control, uses another transmission channel for streaming media transmission, and the like. The plurality of transmission channels may be jointly used for data service transmission.

In an example of this application, a plurality of transmission channels may be multiplexed in a same physical link, and different transmission priorities are set for different transmission channels, then different transmission channels may be invoked at different times based on a priority sequence. For example, there are two transmission channels in a same physical link, and a priority of a transmission channel 1 is higher than a priority of a transmission channel 2, then the transmission channels with different priorities may be invoked based on the priority sequence, to meet a data service transmission requirement.

203. Send a first link switching notification message to a data receive end, where the first link switching notification message includes information indicating that the physical link used by the transmission path is switched from the first physical link group to the second physical link group.

In an embodiment of this application, the first physical link group is currently used to transmit the data between the data transmit end and the data receive end. Therefore, the data transmit end may use a physical link in the first physical link group to send the first link switching notification message, so that the data receive end may switch a physical link on the data receive end side based on the received first link switching notification message.

In an example of this application, after the sending a first link switching notification message to a data receive end in step 203, the method further includes:

F1. Receive a first link switching feedback message sent by the data receive end.

F2. If the first link switching feedback message indicates that the data receive end cannot switch the first physical link group to the second physical link group, switch, based on the preconfigured link switching policy and the transmission information of the transmission path, the physical link used by the transmission path from the first physical link group to a third physical link group, where the third physical link group includes at least one physical link, and the third physical link group and the first physical link group have one or more same physical links, or each physical link of the third physical link group is different from that of the first physical link group; and send a second link switching notification message to the data receive end.

F3. If the first link switching feedback message indicates that the data receive end successfully switches the first physical link group to the second physical link group, trigger execution of the following step: continuing transmitting the data through a transmission path that uses the second physical link group.

Step F1 to step F3 describe a process in which the physical link is switched between the data transmit end and the data receive end in a negotiation manner, so that both the data transmit end and the data receive end can successfully switch the physical link, and successful switching of the physical link between the data transmit end and the data receive end is ensured. For example, the data receive end cannot switch the first physical link group to the second physical link group in step F2. Therefore, the data transmit end needs to perform step 202 again, to be specific, the data transmit end may switch the physical link again, and then send the second link switching notification message. When the data receive end can switch the first physical link group to the third physical link group, the data transmit end continues transmitting the data through a transmission path that uses the third physical link group.

204. Continue transmitting the data through a transmission path that uses the second physical link group.

In this embodiment of this application, it may be learned from step 202 that the transmission path of the data transmit end is switched from the first physical link group to the physical link group, then the data transmit end may continue transmitting the data through the transmission path that uses the second physical link group, to implement that the data transmit end uses a plurality of physical links to complete data transmission, and that the data transmit end may automatically switch the physical links based on the preconfigured link switching policy and the transmission information of the transmission path. Therefore, physical link switching in data transmission may be completed without manual operation of a user.

For example, the data transmit end configures a unified data identifier for to-be-transmitted data, divides the to-be-transmitted data into a plurality of data segments, and configures a corresponding data sequence number for each data segment. For example, data sequence numbers are from 1 to 100. If the data transmit end uses the first physical link group to transmit data segments whose data sequence numbers are from 1 to 30, the data receive end may use the first physical link group to receive the data segments whose data sequence numbers are from 1 to 30 and that are sent by the data transmit end. After the data transmit end switches the physical link, the data transmit end may continue to use the second physical link group to transmit data segments whose data sequence numbers are from 31 to 100. The data receive end may use the second physical link group to receive the data segments whose data sequence numbers are from 31 to 100 and that are sent by the data transmit end. The data receive end may combine the data segments based on a fact that the received data segments whose data sequence numbers are from 1 to 30 have the same data identifier as the received data segments whose data sequence numbers are from 31 to 100, to obtain the original data sent by the data transmit end.

In an example of this application, the continuing transmitting the data through a transmission path that uses the second physical link group in step 204 includes:

G1. Encapsulate the data by using a transport layer protocol corresponding to the physical link in the first physical link group.

G2. Continue transmitting, through the transmission path that uses the second physical link group, the data that is encapsulated by using the transport layer protocol.

The data transmit end may further implement transmission across physical layers performed by using different application side protocols. For example, the data transmit end encapsulates the data by using the transport layer protocol corresponding to the physical link in the first physical link group, and continues transmitting, through the transmission path that uses the second physical link group, the data that is encapsulated by using the transport layer protocol. The data transmit end may reuse an existing transport layer protocol to implement data transmission across physical links. Transmission is performed based on a specific physical link for many original service application protocols. To reuse an existing upper-layer application as much as possible, other physical links may be multiplexed for transmission in bottom-layer transmission. For example, protocols such as an advanced audio distribution profile (Advanced Audio Distribution Profile, A2DP) Bluetooth headset, an object push profile (Object Push Profile, OPP), and a hand free profile (HFP, Hand Free Profile) are applied to a WiFi link, to implement a function in which an upper-layer service application protocol is unchanged and a bottom-layer physical link is dynamically switched.

Figure 7:
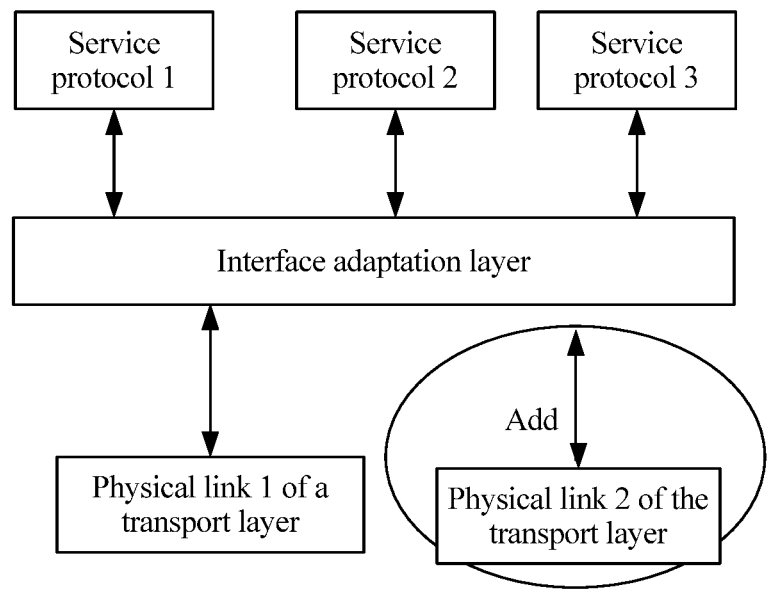
FIG. 7 is a possible schematic diagram in which a service protocol is adaptable to different physical links according to this application.

Referring to FIG. 7, FIG. 7 is a possible schematic diagram in which a service protocol is adaptable to different physical links according to this application. A data transmit end is provided with an interface adaptation layer and a transport layer, and the data transmit end may transmit data by using a plurality of service protocols such as a service protocol 1, a service protocol 2, and a service protocol 3. The transport layer of the data transmit end is configured with a physical link 1. If a physical link 2 is added between the data transmit end and a data receive end, the transport layer of the data transmit end configures the physical link 2, and data that is encapsulated through the interface adaptation layer by using the service protocol 1, the service protocol 2, and the service protocol 3 may be transmitted through the physical link 2, to implement transmission across physical layers performed by using different application side protocols.

It can be learned from the foregoing example description of this application that the transmission path used for data transmission is obtained, and the transmission path currently uses the first physical link group to transmit the data; the physical link used by the transmission path is switched from the first physical link group to the second physical link group based on the preconfigured link switching policy and the transmission information of the transmission path, where the transmission information includes the information obtained by monitoring the first physical link group used by the transmission path; and the data continues to be transmitted through the transmission path that uses the second physical link group. In this embodiment of this application, the physical link used by the transmission path is switched from the first physical link group to the second physical link group based on the preconfigured link switching policy and the transmission information of the transmission path. Therefore, the physical link may be automatically and dynamically adjusted for the data that needs to be transmitted, without requiring the user to determine a to-be-used physical link and to pay attention to various physical links, so as to resolve a problem of a data transmission failure caused because the user cannot correctly select a physical link, and to improve data transmission efficiency.

Figure 8:
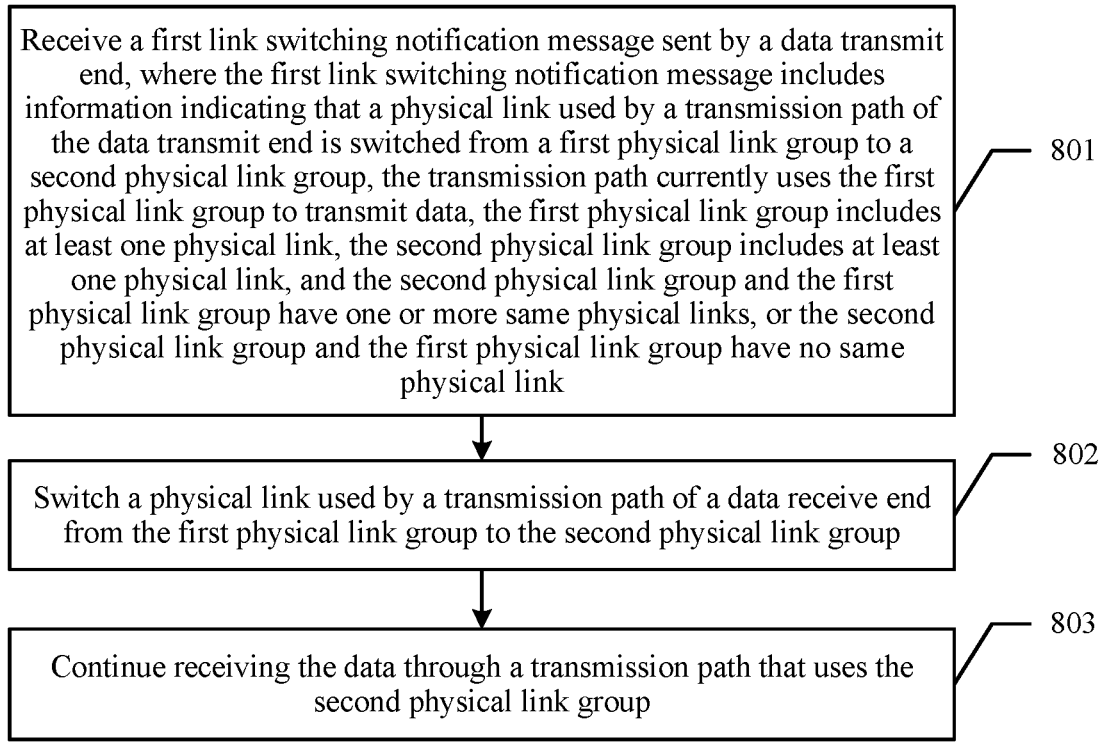
FIG. 8 is a schematic block flowchart of a possible data receiving method according to this application.

The method in which a data transmit end automatically switches a physical link to complete data transmission across physical links is described in the foregoing embodiment. The following describes a data receiving method from a perspective of a data receive end. The data receive end may automatically switch a physical link to complete data receiving across physical links. Referring to FIG. 8, FIG. 8 shows a data receiving method according to an embodiment of this application, and the data receiving method includes the following steps.

801. Receive a first link switching notification message sent by a data transmit end, where the first link switching notification message includes information indicating that a physical link used by a transmission path of the data transmit end is switched from a first physical link group to a second physical link group, the transmission path currently uses the first physical link group to transmit data, the first physical link group includes at least one physical link, the second physical link group includes at least one physical link, and the second physical link group and the first physical link group have one or more same physical links, or the second physical link group and the first physical link group have no same physical link.

In an embodiment of this application, the first physical link group is currently used to transmit the data between the data transmit end and the data receive end. Therefore, the data transmit end may use a physical link in the first physical link group to send the first link switching notification message, so that the data receive end may determine, based on the received first link switching notification message, that the physical link used by the transmission path of the data transmit end is switched from the first physical link group to the second physical link group. Both the physical link included in the first physical link group and the physical link included in the second physical link group are physical links established between the data transmit end and the data receive end, for example, a Bluetooth link, an NFC link, a WiFi link, and the like that are established between the data transmit end and the data receive end.

In an example of this application, after the receiving a first link switching notification message sent by a data transmit end in step 801, the method further includes:

H1. Determine whether a data receive end can switch the first physical link group to the second physical link group.

H2. If the data receive end cannot switch the first physical link group to the second physical link group, send a first link switching feedback message to the data transmit end, where the first link switching feedback message includes information indicating that the data receive end cannot switch the first physical link group to the second physical link group.

The physical link may be switched between the data transmit end and the data receive end in a negotiation manner, so that both the data transmit end and the data receive end can successfully switch the physical link, and successful switching of the physical link between the data transmit end and the data receive end is ensured. For example, after the data receive end receives the first link switching notification message, the data receive end may determine whether the data receive end can switch the first physical link group to the second physical link group. If the data receive end cannot switch the first physical link group to the second physical link group, the data transmit end needs to switch the physical link again, and then send a second link switching notification message. In an example of this application, the data receive end needs to determine again whether the data receive end can successfully switch the first physical link group to a third physical link group. When the data receive end can switch the first physical link group to the third physical link group, the data transmit end continues transmitting the data through a transmission path that uses the third physical link group.

In an example of this application, after the receiving a first link switching notification message sent by a data transmit end in step 801, the method further includes:

H1. Determine whether a data receive end can switch the first physical link group to the second physical link group.

H3. If the data receive end can switch the first physical link group to the second physical link group, after a physical link used by a transmission path of the data receive end is switched from the first physical link group to the second physical link group, send a first link switching feedback message to the data transmit end, where the first link switching feedback message includes information indicating that the data receive end successfully switches the first physical link group to the second physical link group.

The physical link may be switched between the data transmit end and the data receive end in a negotiation manner, so that both the data transmit end and the data receive end can successfully switch the physical link, and successful switching of the physical link between the data transmit end and the data receive end is ensured. For example, after the data receive end receives the first link switching notification message, the data receive end may determine whether the data receive end can switch the first physical link group to the second physical link group. If the data receive end can switch the first physical link group to the second physical link group, the data receive end sends the first link switching feedback message to the data transmit end after performing step 802, and the data transmit end determines, by using the received first link switching feedback message, that the data receive end successfully switches the first physical link group to the second physical link group.

802. Switch a physical link used by a transmission path of a data receive end from the first physical link group to the second physical link group.

In this embodiment of this application, the data receive end may switch the physical link based on an instruction of the data transmit end. A switched physical link of the transmission path of the data receive end is defined as the second physical link group. The second physical link group includes at least one physical link. The second physical link group and the first physical link group have one or more same physical links, or the second physical link group and the first physical link group have no same physical link. For example, if the first physical link group includes a physical link 1 and a physical link 2, the second physical link group may include a physical link 3 and a physical link 4, or the second physical link group may include the physical link 2 and the physical link 3. To be specific, some same physical links may exist in the first physical link group and the second physical link group, or each physical link of the first physical link group is different from that of the second physical link group. Specific implementation depends on a selected link switching policy and monitored transmission information in an actual scenario. This is not limited herein.

803. Continue receiving the data through a transmission path that uses the second physical link group.

In this embodiment of this application, after the physical link used by the transmission path of the data receive end is switched from the first physical link group to the second physical link group, both the data transmit end and the data receive end perform data transmission by using the second physical link group. In this embodiment of this application, physical link switching in data transmission may be automatically completed between the data transmit end and the data receive end without manual operation of a user.

For example, the data transmit end configures a unified data identifier for to-be-transmitted data, divides the to-be-transmitted data into a plurality of data segments, and configures a corresponding data sequence number for each data segment. For example, data sequence numbers are from 1 to 100. If the data transmit end uses the first physical link group to transmit data segments whose data sequence numbers are from 1 to 30, the data receive end may use the first physical link group to receive the data segments whose data sequence numbers are from 1 to 30 and that are sent by the data transmit end. After the data transmit end switches the physical link, the data transmit end may continue to use the second physical link group to transmit data segments whose data sequence numbers are from 31 to 100. The data receive end may use the second physical link group to receive the data segments whose data sequence numbers are from 31 to 100 and that are sent by the data transmit end. The data receive end may combine the data segments based on a fact that the received data segments whose data sequence numbers are from 1 to 30 have the same data identifier as the received data segments whose data sequence numbers are from 31 to 100, to obtain the original data sent by the data transmit end.

In an example of the application, after the continuing receiving the data through a transmission path that uses the second physical link group in step 803, the method further includes:

J1. Decapsulate the data by using a transport layer protocol corresponding to the physical link in the first physical link group.

The data transmit end may further implement transmission across physical layers performed by using different application side protocols. For example, the data transmit end encapsulates the data by using the transport layer protocol corresponding to the physical link in the first physical link group, and continues transmitting, through a transmission path that uses the second physical link group, the data that is encapsulated by using the transport layer protocol. The data transmit end may reuse an existing transport layer protocol to implement data transmission across physical links. Transmission is performed based on a specific physical link for many original service application protocols. To reuse an existing upper-layer application as much as possible, other physical links may be multiplexed for transmission in bottom-layer transmission. After receiving the data sent by the data transmit end, the data receive end decapsulates the data by using the transport layer protocol corresponding to the physical link in the first physical link group, to support transmission across physical layers performed by using different application side protocols.

It can be learned from the foregoing description of this embodiment of this application that the data receive end may switch, based on the first link switching notification message sent by the data transmit end, the physical link used by the transmission path from the first physical link group to the second physical link group. Therefore, the physical link may be automatically and dynamically adjusted for the data that needs to be transmitted, without requiring the user to determine a to-be-used physical link and to pay attention to various physical links, so as to resolve a problem of a data transmission failure caused because the user cannot correctly select a physical link, and to improve data transmission efficiency.

To better understand and implement the foregoing solutions in the embodiments of this application, the following performs specific description by using a corresponding application scenario as an example. For example, a data transmit end and a data receive end are two mobile phones. Data transmission is performed between the two mobile phones by using a plurality of physical links. For example, when file or data sharing is performed between the two mobile phones, the physical link switching solutions in FIG. 2 to FIG. 8 may be used. A physical link is configured for a transmission path based on a to-be-transmitted data service, then a transmission mode is determined, and finally the physical link is automatically switched based on transmission load and QoS. When one mobile phone is connected to the other mobile phone, the physical link is automatically switched based on different volumes of to-be-transmitted data, to achieve optimal power consumption when performance meets a requirement. For example, as shown in FIG. 9, FIG. 9 is a schematic diagram of a result of data transmission across physical links that is displayed on a user interface (User Interface, UI) of a mobile phone. For example, two types of data services need to be transmitted between two mobile phones, and the two types of data services are respectively 100 M audio data and 200 M video live broadcast data. For the audio data, 20 M data may be first transmitted by using a mobile data link, then the mobile data link is switched to a WiFi link, and 80 M data is transmitted by using the WiFi link. For the video live broadcast data, 10 M data may be first transmitted by using a mobile data link, then the mobile data link is switched to a WiFi link, and 190 M data is transmitted by using the WiFi link. In the data transmit end provided in this application, data transmission across physical links may be automatically implemented without requiring a user to manually configure a physical link.

In another example of this application, the data transmit end may further have functions such as a WiFi sound box, a P2P, OPP file transmission, and a WiFi telephone. Protocols such as a Bluetooth A2DP (Bluetooth headset), an OPP, and an HFP are applied to a WiFi link, to implement a function in which an upper-layer application protocol is unchanged and a bottom-layer physical link is dynamically switched.

In another example of this application, when WiFi interference is extremely strong, the data transmit end may temporarily combine and reuse classic Bluetooth or Bluetooth BLE for data transmission. For another example, the data transmit end may combine an NFC link and a Bluetooth link. The NFC link is used for authentication, and the Bluetooth link is used for specific data transmission and interaction.

It may be learned from the foregoing example description of this application that different physical links between terminals share authorization, for example, pairing is performed through Bluetooth, to directly obtain information and use of WiFi, NFC, and BLE links. Different physical links are automatically switched or combined based on capabilities and limitations of two parties (a transmit end and a receive end) of data transmission, current load, and QoS, to ensure optimal power consumption when performance meets a requirement. Load and QoS adjustments are performed on different physical transmission links, and the physical links are adaptively switched, to ensure an optimal comprehensive effect of power consumption and performance. An existing link transport layer that is used as a bottom layer in service transmission is replaced, an existing protocol and upper-layer software are reused, and a virtual device layer is directly provided. For example, for a Bluetooth sound box that may be connected to a Bluetooth device of a mobile phone, bottom-layer transmission is actually performed through WiFi, and an existing operation manner of a user is unchanged, but the transmission is updated. For an inventory device and a service application or for uniform user experience, link switching is performed at a bottom layer of a service. For example, an upper layer is a Bluetooth sound box, but bottom-layer transmission is actually performed by using a WiFi link, or in some conditions, an original Bluetooth link is switched to the WiFi link based on performance or power consumption.

It should be noted that for brief description, the foregoing method embodiments are represented as a combination of a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to example embodiments, and the involved actions and modules are not necessarily required by this application.

To better implement the foregoing solutions in the embodiments of this application, the following further provides a related apparatus configured to implement the foregoing solutions.

Referring to FIG. 10-*a*, a data transmit end 1000 provided in this embodiment of this application may include an obtaining module 1001, a link switching module 1002, a message sending module 1003, and a data transmission module 1004.

The obtaining module 1001 is configured to obtain a transmission path used for data transmission. The transmission path currently uses a first physical link group to transmit data, and the first physical link group includes at least one physical link.

The link switching module 1002 is configured to switch, based on a preconfigured link switching policy and transmission information of the transmission path, a physical link used by the transmission path from the first physical link group to a second physical link group. The second physical link group includes at least one physical link, the second physical link group and the first physical link group have one or more same physical links, or the second physical link group and the first physical link group have no same physical link, and the transmission information includes information obtained by monitoring the first physical link group used by the transmission path.

The message sending module 1003 is configured to send a first link switching notification message to a data receive end. The first link switching notification message includes information indicating that the physical link used by the transmission path is switched from the first physical link group to the second physical link group.

The data transmission module 1004 is configured to continue transmitting the data through a transmission path that uses the second physical link group.

In an example of this application, the link switching module 1002 is specifically configured to: when the transmission path uses the first physical link group to transmit the data, collect statistics about quality of service QoS of the first physical link group used by the transmission path, to obtain QoS information; and switch, based on a QoS policy in the link switching policy and the QoS information, the physical link used by the transmission path from the first physical link group to the second physical link group.

In an example of this application, the link switching module 1002 is specifically configured to: collect, based on the QoS policy in the link switching policy, statistics about QoS of the second physical link group of the data transmit end that configures the transmission path, to obtain QoS information of the second physical link group; and switch, based on the QoS policy in the link switching policy and the QoS information of the second physical link group, the physical link used by the transmission path from the first physical link group to the second physical link group.

In an example of this application, the link switching module 1002 is specifically configured to: when the transmission path uses the first physical link group to transmit the data, monitor a transmission rate of the first physical link group used by the transmission path, to obtain load information; and switch, based on a load policy in the link switching policy and the load information, the physical link used by the transmission path from the first physical link group to the second physical link group.

In an example of this application, the link switching module 1002 is specifically configured to: collect, based on the load policy in the link switching policy, statistics about load of the second physical link group of the data transmit end that configures the transmission path, to obtain load information of the second physical link group; and switch, based on the load policy in the link switching policy and the load information of the second physical link group, the physical link used by the transmission path from the first physical link group to the second physical link group.

In an example of this application, the link switching module 1002 is specifically configured to: when the transmission path uses the first physical link group to transmit the data, obtain path availability information based on a quantity of links and a quantity of paths that are used by the data transmit end that configures the transmission path, where the path availability information includes information about whether the transmission path can continue to use the first physical link group; and switch, based on the link switching policy and the path availability information, the physical link used by the transmission path from the first physical link group to the second physical link group.

In an example of this application, referring to FIG. 10-*b*, the data transmit end 1000 further includes a physical link configuration module 1005, configured to: before the obtaining module 1001 obtains the transmission path used for data transmission, obtain a content type and a data volume of the data; and configure the first physical link group for the transmission path based on the content type and the data volume.

In an example of this application, referring to FIG. 10-c, the data transmit end 1000 further includes an authentication module 1006, configured to: obtain authentication information of a first physical link in the first physical link group; and if authentication of the first physical link succeeds, determine, based on the authentication information of the first physical link, that authentication of the physical link in the second physical link group between the data transmit end that configures the transmission path and the data receive end succeeds.

In an example of this application, the data transmission module 1004 is specifically configured to: encapsulate the data by using a transport layer protocol corresponding to the physical link in the first physical link group; and continue transmitting, through the transmission path that uses the second physical link group, the data that is encapsulated by using the transport layer protocol.

In an example of this application, referring to FIG. 10-d, the data transmit end 1000 further includes a message receiving module 1007.

The message receiving module 1007 is configured to: after the message sending module 1003 sends the first link switching notification message to the data receive end, receive a first link switching feedback message sent by the data receive end.

The link switching module 1002 is further configured to: if the first link switching feedback message indicates that the data receive end cannot switch the first physical link group to the second physical link group, switch, based on the preconfigured link switching policy and the transmission information of the transmission path, the physical link used by the transmission path from the first physical link group to a third physical link group, where the third physical link group includes at least one physical link, and the third physical link group and the first physical link group have one or more same physical links, or each physical link of the third physical link group is different from that of the first physical link group; and send a second link switching notification message to the data receive end; or if the first link switching feedback message indicates that the data receive end successfully switches the first physical link group to the second physical link group, trigger execution of the data transmission module.

In an example of this application, when the first physical link group includes a first physical link, the link switching module 1002 is specifically configured to: switch, based on the preconfigured link switching policy and the transmission information of the transmission path, the physical link used by the transmission path from the first physical link to a second physical link; or in addition to the first physical link used by the transmission path, add a second physical link based on the preconfigured link switching policy and the transmission information of the transmission path. The second physical link belongs to the second physical link group.

Referring to FIG. 11-a, a data receive end 1100 provided in this embodiment of this application may include a message receiving module 1101, a link switching module 1102, and a data receiving module 1103.

The message receiving module 1101 is configured to receive a first link switching notification message sent by a data transmit end. The first link switching notification message includes information indicating that a physical link used by a transmission path of the data transmit end is switched from a first physical link group to a second physical link group, the transmission path currently uses the first physical link group to transmit data, the first physical link group includes at least one physical link, the second physical link group includes at least one physical link, and the second physical link group and the first physical link group have one or more same physical links, or the second physical link group and the first physical link group have no same physical link.

The link switching module 1102 is configured to switch a physical link used by a transmission path of the data receive end from the first physical link group to the second physical link group.

The data receiving module 1103 is configured to continue receiving the data through a transmission path that uses the second physical link group.

In an example of this application, referring to FIG. 11-b, the data receive end 1100 further includes a physical link determining module 1104 and a message sending module 1105.

The physical link determining module 1104 is configured to: after the message receiving module 1101 sends the first link switching notification message, determine whether the data receive end can switch the first physical link group to the second physical link group.

The message sending module 1105 is configured to: if the data receive end cannot switch the first physical link group to the second physical link group, send a first link switching feedback message to the data transmit end. The first link switching feedback message includes information indicating that the data receive end cannot switch the first physical link group to the second physical link group.

In an example of this application, referring to FIG. 11-b, the physical link determining module 1104 is configured to: after the message receiving module receives the first link switching notification message sent by the data transmit end, determine whether the data receive end can switch the first physical link group to the second physical link group.

The message sending module 1105 is configured to: if the data receive end can switch the first physical link group to the second physical link group, after the physical link used by the transmission path of the data receive end is switched from the first physical link group to the second physical link group, send a first link switching feedback message to the data transmit end. The first link switching feedback message includes information indicating that the data receive end successfully switches the first physical link group to the second physical link group.

In an example of this application, referring to FIG. 11-c, the data receive end 1100 further includes a data parsing module 1106, configured to: after the data receiving module 1103 continues receiving the data through the transmission path that uses the second physical link group, decapsulate the data by using a transport layer protocol corresponding to the physical link in the first physical link group.

In an example of this application, when the first physical link group includes a first physical link, the link switching module 1102 is specifically configured to: switch, based on the first link switching notification message, the physical link used by the transmission path of the data receive end from the first physical link to a second physical link; or in addition to the first physical link used by the transmission path of the data receive end, add a second physical link based on the first link switching notification message. The second physical link belongs to the second physical link group.

It should be noted that content such as information exchange and an execution process between the modules/ units in the foregoing apparatuses is based on a same idea as that of the method embodiments of this application, and brings same technical effects as those brought by the method embodiments of this application. For specific content, refer to the descriptions in the foregoing method embodiments of this application. Details are not described herein again.

An embodiment of this application further provides a computer storage medium. The computer storage medium stores a program. When the program runs, some or all of the steps described in the foregoing method embodiments are performed.

Figure 12:
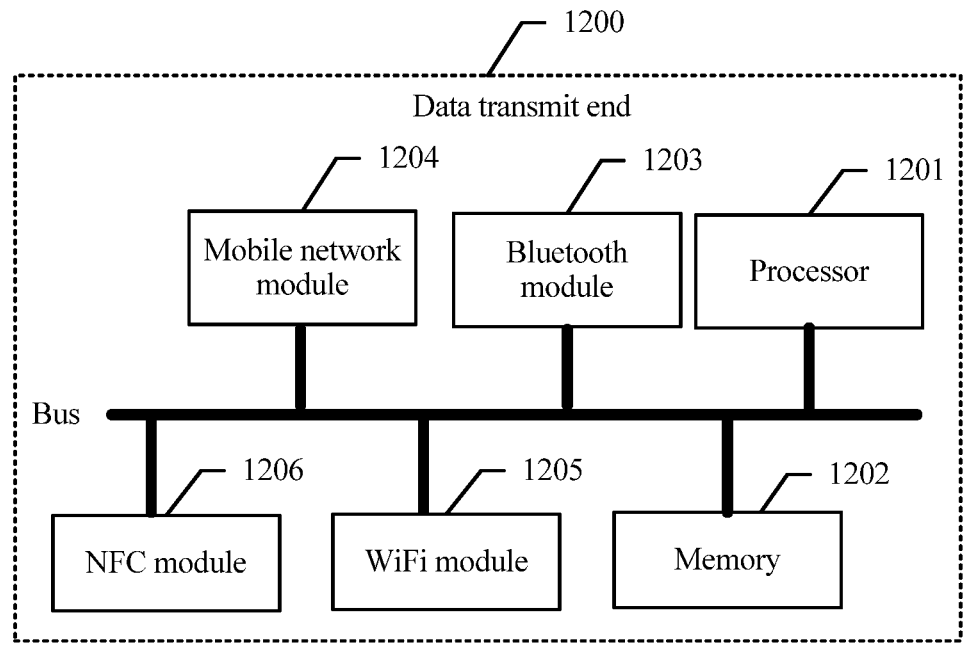
FIG. 12 is a schematic diagram of structural composition of another possible data transmit end according to an embodiment of this application.

Referring to FIG. 12, a data transmit end 1200 includes at least one processor 1201 and a memory 1202 (there may be one or more processors 1201 in the data transmit end 1200, and one processor is used as an example in FIG. 12), a Bluetooth module 1203, a mobile network module 1204, a WiFi module 1205, and an NFC module 1206. In some embodiments of this application, the processor 1201 and the memory 1202 may be connected by using a bus or in another manner. For example, the processor 1201 and the memory 1202 are connected by using the bus in FIG. 12.

The memory 1202 may include a read-only memory and a random access memory, and provide an instruction and data for the processor 1201. A part of the memory 1202 may further include a non-volatile random access memory (English full name: Non-volatile Random Access Memory, NVRAM for short). The memory 1202 stores an operating system and an operation instruction, an executable module or a data structure, or a subset thereof, or an extended set thereof. The operation instruction may include various operation instructions that are used to implement various operations. The operating system may include various system programs that are used to implement various basic services and process a hardware-based task.

The processor 1201 controls an operation of the data transmit end, and the processor 1201 may be further referred to as a central processing unit (English full name: Central Processing Unit, CPU for short). In specific application, components of the data transmit end are coupled together by using a bus system. In addition to a data bus, the bus system may further include a power bus, a control bus, a status signal bus, and the like. However, for clear description, various types of buses in the figure are referred to as the bus system.

The method disclosed in the embodiments of this application may be applied to the processor 1201, or may be implemented by the processor 1201. The processor 1201 may be an integrated circuit chip, and has a signal processing capability. In an implementation process, steps of the foregoing method may be completed by using an integrated logic circuit of hardware in the processor 1201 or instructions in a form of software. The processor 1201 may be a general purpose processor, a digital signal processor (English full name: digital signal processing, DSP for short), an application-specific integrated circuit (English full name: Application Specific Integrated Circuit, ASIC for short), a field-programmable gate array (English full name: Field-Programmable Gate Array, FPGA for short) or another programmable logic device, a discrete gate or a transistor logic device, or a discrete hardware assembly, and may implement or perform the method, steps, and logical block diagrams disclosed in the embodiments of this application. The general purpose processor may be a microprocessor, or the processor may be any conventional processor or the like. The steps of the method disclosed in the embodiments of this application may be directly performed by a hardware decoding processor, or performed by using a combination of a hardware module and a software module in a decoding processor. The software module may be located in a mature storage medium in the art, such as a random access memory, a flash memory, a read-only memory, a programmable read-only memory or an electrically erasable programmable memory, or a register. The storage medium is located in the memory 1202, and the processor 1201 reads information in the memory 1202 and completes the steps of the foregoing method in combination with the hardware of the processor 1201.

The Bluetooth module 1203, the mobile network module 1204, the WiFi module 1205, and the NFC module 1206 may be configured to: receive input digital or character information, generate signal input related to related settings and function control of the data transmit end, and output the digital or character information by using an external interface. The Bluetooth module 1203, the mobile network module 1204, the WiFi module 1205, and the NFC module 1206 are configured to perform data transmission under control of the processor 1201. A physical link in a first physical link group and a physical link in a second physical link group may be Bluetooth links implemented by using the Bluetooth module 1203, mobile data links implemented by using the mobile network module 1204, WiFi links implemented by using the WiFi module 1205, or NFC links implemented by using the NFC module 1206, where the first physical link group and the second physical link group are established between the data transmit end and a data receive end. For example, a physical link that can be controlled by the processor 1203 includes a WiFi link, a classic Bluetooth link, an NFC link, a mobile network link, or the like. The Bluetooth module 1203 may be configured to configure the Bluetooth link. The mobile network module 1204 may be configured to configure the mobile network link. The WiFi module 1205 may be configured to configure the WiFi link. The NFC module 1206 may be configured to configure the NFC link.

In this embodiment of this application, the memory 1202 is configured to store a program, an instruction, and data.

The processor 1201 invokes the program, the instruction, and the data in the memory 1202, to perform the following steps: obtaining a transmission path used for data transmission, where the transmission path currently uses a first physical link group to transmit the data, and the first physical link group includes at least one physical link; switching, based on a preconfigured link switching policy and transmission information of the transmission path, a physical link used by the transmission path from the first physical link group to a second physical link group, where the second physical link group includes at least one physical link, the second physical link group and the first physical link group have one or more same physical links, or the second physical link group and the first physical link group have no same physical link, and the transmission information includes information obtained by monitoring the first physical link group used by the transmission path; sending a first link switching notification message to a data receive end, where the first link switching notification message includes information indicating that the physical link used by the transmission path is switched from the first physical link group to the second physical link group; and continuing transmitting the data through a transmission path that uses the second physical link group.

In an example of this application, the processor 1201 is specifically configured to perform the following steps: when the transmission path uses the first physical link group to transmit the data, collecting statistics about quality of service QoS of the first physical link group used by the transmission path, to obtain QoS information; and switching, based on a QoS policy in the link switching policy and the QoS information, the physical link used by the transmission path from the first physical link group to the second physical link group.

In an example of this application, the processor 1201 is specifically configured to perform the following steps: collecting, based on the QoS policy in the link switching policy, statistics about QoS of the second physical link group of the data transmit end that configures the transmission path, to obtain QoS information of the second physical link group; and switching, based on the QoS policy in the link switching policy and the QoS information of the second physical link group, the physical link used by the transmission path from the first physical link group to the second physical link group.

In an example of this application, the processor 1201 is specifically configured to perform the following steps: when the transmission path uses the first physical link group to transmit the data, monitoring a transmission rate of the first physical link group used by the transmission path, to obtain load information; and switching, based on a load policy in the link switching policy and the load information, the physical link used by the transmission path from the first physical link group to the second physical link group.

In an example of this application, the processor 1201 is specifically configured to perform the following steps: collecting, based on the load policy in the link switching policy, statistics about load of the second physical link group of the data transmit end that configures the transmission path, to obtain load information of the second physical link group; and switching, based on the load policy in the link switching policy and the load information of the second physical link group, the physical link used by the transmission path from the first physical link group to the second physical link group.

In an example of this application, the processor 1201 is specifically configured to perform the following steps: when the transmission path uses the first physical link group to transmit the data, obtaining path availability information based on a quantity of links and a quantity of paths that are used by the data transmit end that configures the transmission path, where the path availability information includes information about whether the transmission path can continue to use the first physical link group; and switching, based on the link switching policy and the path availability information, the physical link used by the transmission path from the first physical link group to the second physical link group.

In an example of this application, the processor 1201 is further configured to perform the following steps: before obtaining the transmission path used for data transmission, obtaining a content type and a data volume of the data; and configuring the first physical link group for the transmission path based on the content type and the data volume.

In an example of this application, the processor 1201 is further configured to perform the following steps: obtaining authentication information of a first physical link in the first physical link group; and if authentication of the first physical link succeeds, determining, based on the authentication information of the first physical link, that authentication of the physical link in the second physical link group between the data transmit end that configures the transmission path and the data receive end succeeds.

In an example of this application, the processor 1201 is specifically configured to perform the following steps: encapsulating the data by using a transport layer protocol corresponding to the physical link in the first physical link group; and continuing transmitting, through the transmission path that uses the second physical link group, the data that is encapsulated by using the transport layer protocol.

In an example of this application, the processor 1201 is further configured to perform the following steps: after sending the first link switching notification message to the data receive end, receiving a first link switching feedback message sent by the data receive end; and if the first link switching feedback message indicates that the data receive end cannot switch the first physical link group to the second physical link group, switching, based on the preconfigured link switching policy and the transmission information of the transmission path, the physical link used by the transmission path from the first physical link group to a third physical link group, where the third physical link group includes at least one physical link, and the third physical link group and the first physical link group have one or more same physical links, or each physical link of the third physical link group is different from that of the first physical link group; and sending a second link switching notification message to the data receive end; or if the first link switching feedback message indicates that the data receive end successfully switches the first physical link group to the second physical link group, triggering execution of the following step: continuing transmitting the data through the transmission path that uses the second physical link group.

In an example of this application, when the first physical link group includes a first physical link, the processor 1201 is specifically configured to perform the following step: switching, based on the preconfigured link switching policy and the transmission information of the transmission path, the physical link used by the transmission path from the first physical link to a second physical link; or in addition to the first physical link used by the transmission path, adding a second physical link based on the preconfigured link switching policy and the transmission information of the transmission path. The second physical link belongs to the second physical link group.

It may be understood that in the foregoing descriptions of the processor 1201 in the example of this application, a sending step and a receiving step that are performed by the processor 1201 may be considered as being completed by controlling at least one wireless network module of the Bluetooth module 1203, the mobile network module 1204, the WiFi module 1205, and the NFC module 1206. The wireless network module is selected based on the physical link used by the transmission path of the data transmit end. For example, if the first physical link group includes a Bluetooth module, the processor 1201 may control the Bluetooth module 1203 to send the first link switching notification message to the data receive end. If the second physical link group includes a Bluetooth link and a WiFi link, the processor 1201 may control the Bluetooth module 1203 and the WiFi module 1205 to send the to-be-transmitted data to the data receive end.

Figure 13:
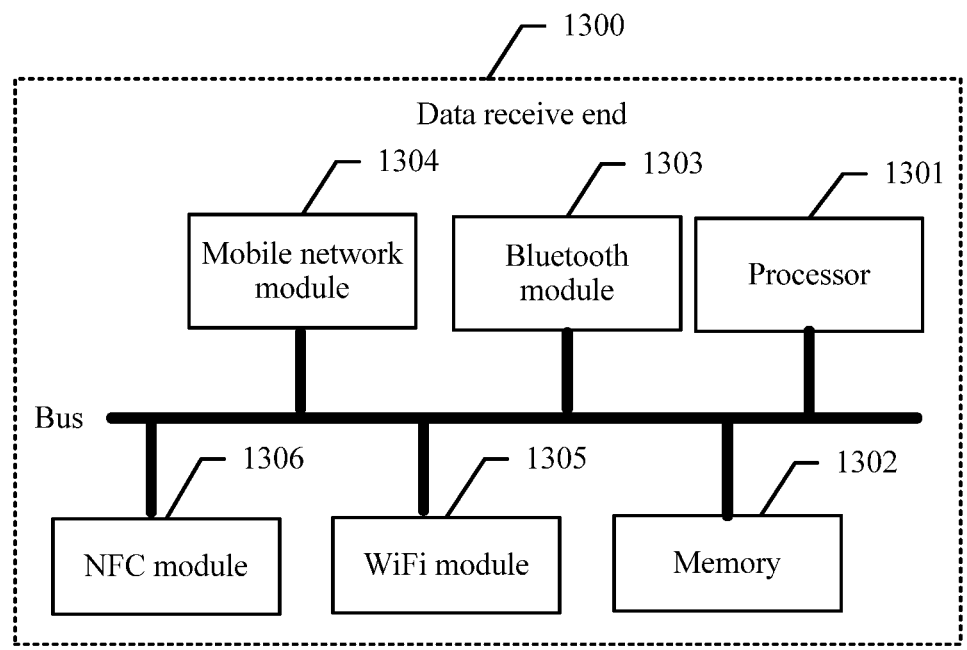
FIG. 13 is a schematic diagram of structural composition of another possible data receive end according to an embodiment of this application.

Referring to FIG. 13, a data receive end 1300 includes at least one processor 1301 and a memory 1302 (there may be one or more processors 1301 in the data receive end 1300, and one processor is used as an example in FIG. 13), a Bluetooth module 1303, a mobile network module 1304, a WiFi module 1305, and an NFC module 1306. In some embodiments of this application, the processor 1301 and the memory 1302 may be connected by using a bus or in another manner. For example, the processor 1301 and the memory 1302 are connected by using the bus in FIG. 13.

The memory 1302 may include a read-only memory and a random access memory, and provide an instruction and data for the processor 1301. A part of the memory 1302 may further include an NVRAM. The memory 1302 stores an operating system and an operation instruction, an executable module or a data structure, or a subset thereof, or an extended set thereof. The operation instruction may include various operation instructions that are used to implement various operations. The operating system may include various system programs that are used to implement various basic services and process a hardware-based task.

The processor 1301 controls an operation of the data receive end, and the processor 1301 may be further referred to as a CPU. In specific application, components of the data receive end are coupled together by using a bus system. In addition to a data bus, the bus system may further include a power bus, a control bus, a status signal bus, and the like. However, for clear description, various types of buses in the figure are referred to as the bus system.

The method disclosed in the embodiments of this application may be applied to the processor 1301, or may be implemented by the processor 1301. The processor 1301 may be an integrated circuit chip, and has a signal processing capability. In an implementation process, steps of the foregoing method may be completed by using an integrated logic circuit of hardware in the processor 1301 or instructions in a form of software. The processor 1301 may be a general purpose processor, a DSP, an ASIC, an FPGA or another programmable logic device, a discrete gate or a transistor logic device, or a discrete hardware assembly, and may implement or perform the method, steps, and logical block diagrams disclosed in the embodiments of this application. The general purpose processor may be a microprocessor, or the processor may be any conventional processor or the like. The steps of the method disclosed in the embodiments of this application may be directly performed by a hardware decoding processor, or performed by using a combination of a hardware module and a software module in a decoding processor. The software module may be located in a mature storage medium in the art, such as a random access memory, a flash memory, a read-only memory, a programmable read-only memory or an electrically erasable programmable memory, or a register. The storage medium is located in the memory 1302, and the processor 1301 reads information in the memory 1302 and completes the steps of the foregoing method in combination with the hardware of the processor 1301.

The Bluetooth module 1303, the mobile network module 1304, the WiFi module 1305, and the NFC module 1306 may be configured to: receive input digital or character information, generate signal input related to related settings and function control of the data receive end, and output the digital or character information by using an external interface. The Bluetooth module 1303, the mobile network module 1304, the WiFi module 1305, and the NFC module 1306 are configured to perform data transmission under control of the processor 1301. A physical link in a first physical link group and a physical link in a second physical link group may be Bluetooth links implemented by using the Bluetooth module 1303, mobile data links implemented by using the mobile network module 1304, WiFi links implemented by using the WiFi module 1305, or NFC links implemented by using the NFC module 1306, where the first physical link group and the second physical link group are established between the data receive end and the data receive end. For example, a physical link that can be controlled by the processor 1303 includes a WiFi link, a classic Bluetooth link, an NFC link, a mobile network link, or the like. The Bluetooth module 1303 may be configured to configure the Bluetooth link. The mobile network module 1304 may be configured to configure the mobile network link. The WiFi module 1305 may be configured to configure the WiFi link. The NFC module 1306 may be configured to configure the NFC link.

In this embodiment of this application, the memory 1302 is configured to store a program, an instruction, and data.

The processor 1301 invokes the program, the instruction, and the data in the memory 1302, to perform the following steps: receiving a first link switching notification message sent by a data transmit end, where the first link switching notification message includes information indicating that a physical link used by a transmission path of the data transmit end is switched from a first physical link group to a second physical link group, the transmission path currently uses the first physical link group to transmit the data, the first physical link group includes at least one physical link, the second physical link group includes at least one physical link, and the second physical link group and the first physical link group have one or more same physical links, or the second physical link group and the first physical link group have no same physical link; switching a physical link used by a transmission path of the data receive end from the first physical link group to the second physical link group; and continuing receiving the data through a transmission path that uses the second physical link group.

In an example of this application, the processor 1301 is further configured to perform the following steps: after receiving the first link switching notification message sent by the data transmit end, determining whether the data receive end can switch the first physical link group to the second physical link group; and if the data receive end cannot switch the first physical link group to the second physical link group, sending a first link switching feedback message to the data transmit end, where the first link switching feedback message includes information indicating that the data receive end cannot switch the first physical link group to the second physical link group.

In an example of this application, the processor 1301 is further configured to perform the following steps: after receiving the first link switching notification message sent by the data transmit end, determining whether the data receive end can switch the first physical link group to the second physical link group; and if the data receive end can switch the first physical link group to the second physical link group, after the physical link used by the transmission path of the data receive end is switched from the first physical link group to the second physical link group, sending a first link switching feedback message to the data transmit end, where the first link switching feedback message includes information indicating that the data receive end successfully switches the first physical link group to the second physical link group.

In an example of this application, the processor 1301 is further configured to perform the following step: after continuing receiving the data through the transmission path that uses the second physical link group, decapsulating the data by using a transport layer protocol corresponding to the physical link in the first physical link group.

In an example of this application, when the first physical link group includes a first physical link, the processor 1301 is specifically configured to perform the following step: switching, based on the first link switching notification message, the physical link used by the transmission path of the data receive end from the first physical link to a second physical link; or in addition to the first physical link used by the transmission path of the data receive end, adding a second physical link based on the first link switching notification message. The second physical link belongs to the second physical link group.

It may be understood that in the foregoing descriptions of the processor 1301 in the example of this application, a sending step and a receiving step that are performed by the processor 1301 may be considered as being completed by controlling at least one wireless network module of the Bluetooth module 1303, the mobile network module 1304, the WiFi module 1305, and the NFC module 1306. The wireless network module is selected based on the physical link used by the transmission path of the data receive end. For example, if the first physical link group includes a Bluetooth module, the processor 1301 may control the Bluetooth module 1303 to receive the first link switching notification message sent by the data transmit end. If the second physical link group includes a Bluetooth link and a WiFi link, the processor 1301 may control the Bluetooth module 1303 and the WiFi module 1305 to receive the to-be-transmitted data sent by the data transmit end.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables. A person of ordinary skill in the art may understand and implement the embodiments of this application without creative efforts.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for this application, software program implementation is a better implementation in most cases. Based on such an understanding, the technical solutions of this application essentially or the part contributing to the prior art may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of this application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is claimed is:

1. A method, comprising:
   obtaining a first transmission path, wherein when the first transmission path is obtained the first transmission path is using a first physical link group to transmit data to a second device, the first physical link group comprises a first physical link, and the first transmission path uses the first physical link to transmit the data;
   attempting to switch, based on a preconfigured link switching policy and transmission information of the first transmission path, the first physical link used by the first transmission path from the first physical link group to a second physical link group, wherein the second physical link group comprises a second physical link, and the transmission information comprises information obtained by monitoring the first physical link group;
   sending a first link switching notification message to the second device, wherein the first link switching notification message comprises information indicating the attempt to switch the first physical link used by the first transmission path from the first physical link group to the second physical link group; and
   in response to the first physical link used by the first transmission path successfully switching from the first physical link group to the second physical link group, continuing transmitting the data through the first transmission path, wherein after the successful switch of the first physical link used by the first transmission path from the first physical link group to the second physical link group the first transmission path uses the first physical link that is comprised in the second physical link group.

2. The method according to claim 1, wherein attempting to switch, based on the preconfigured link switching policy and the transmission information of the first transmission path, the first physical link used by the first transmission path from the first physical link group to the second physical link group comprises:

when the first transmission path uses the first physical link group to transmit the data, monitoring a transmission rate of the first physical link group used by the first transmission path, to obtain load information; and attempting to switch, based on a load policy in the preconfigured link switching policy and the load information, the first physical link used by the first transmission path from the first physical link group to the second physical link group.

3. The method according to claim 2, wherein attempting to switch, based on the load policy in the preconfigured link switching policy and the load information, the first physical link used by the first transmission path from the first physical link group to the second physical link group comprises:

collecting, based on the load policy in the preconfigured link switching policy, statistics about load of the second physical link group, to obtain load information of the second physical link group, wherein the second physical link group corresponds to a first device that configures the first transmission path; and attempting to switch, based on the load policy in the preconfigured link switching policy and the load information of the second physical link group, the first physical link used by the first transmission path from the first physical link group to the second physical link group.

4. The method according to claim 1, wherein attempting to switch, based on the preconfigured link switching policy and transmission information of the first transmission path, the first physical link used by the first transmission path from the first physical link group to the second physical link group comprises:

when the first transmission path uses the first physical link group to transmit the data, obtaining path availability information based on a quantity of links and a quantity of paths that are used by a first device, wherein the path availability information comprises information about whether the first transmission path is available to continue to be used by the first physical link group, and the first transmission path is configured by the first device; and attempting to switch, based on the preconfigured link switching policy and the path availability information, the first physical link used by the first transmission path from the first physical link group to the second physical link group.

5. The method according to claim 1, wherein before obtaining the first transmission path, the method further comprises:

obtaining a content type of the data and a data volume of the data; and configuring the first physical link group for the first transmission path based on the content type and the data volume.

6. The method according to claim 1, further comprising:

obtaining authentication information of the first physical link in the first physical link group; and when an authentication of the first physical link has succeeded, determining, based on the authentication information of the first physical link, that authentication of the first physical link in the second physical link group between a first device and the second device has succeeded, wherein the first transmission path is configured by the first device.

7. The method according to claim 1, wherein in response to the first physical link used by the first transmission path successfully switching from the first physical link group to the second physical link group, continuing transmitting the data through the first transmission path, wherein after the successful switch of the first physical link used by the first transmission path from the first physical link group to the second physical link group the first transmission path uses the first physical link that is comprised in the second physical link group, comprises:

encapsulating the data using a transport layer protocol corresponding to the first physical link in the first physical link group; and in response to the first physical link used by the first transmission path successfully switching from the first physical link group to the second physical link group, continuing transmitting, through the first transmission path, the data that is encapsulated using the transport layer protocol, wherein after the first physical link used by the first transmission path switches from the first physical link group to the second physical link group the first transmission path uses the first physical link that is comprised in the second physical link group.

8. The method according to claim 1, wherein after sending the first link switching notification message to the second device, the method further comprises:

receiving a first link switching feedback message sent by the second device; and performing the following:

in response to the first link switching feedback message indicating that the second device cannot switch the first physical link group to the second physical link group, switching, based on the preconfigured link switching policy and the transmission information of the first transmission path, the first physical link used by the first transmission path from the first physical link group to a third physical link group, and sending a second link switching notification message to the second device; or when the first link switching feedback message indicates that the second device has successfully switched the first physical link group to the second physical link group, continuing to transmit the data through the first transmission path, wherein after the successful switch of the first physical link used by the first transmission path from the first physical link group to the second physical link group the first transmission path uses the first physical link that is comprised in the second physical link group.

9. The method according to claim 1, wherein attempting to switch, based on the preconfigured link switching policy and transmission information of the first transmission path, the first physical link used by the first transmission path from the first physical link group to the second physical link group comprises:

attempting to switch, based on the preconfigured link switching policy and the transmission information of the first transmission path, the first physical link used by the first transmission path from the first physical link to a second physical link; or in addition to the first physical link used by the first transmission path, adding a second physical link to the first transmission path based on the preconfigured link switching policy and the transmission information of the first transmission path.

10. A method, comprising:

receiving, by a second device, a first link switching notification message from a first device, wherein the first link switching notification message comprises information indicating that a first physical link used by a first transmission path of the first device is requested to be switched from a first physical link group to a second physical link group, wherein when the first link switching notification is received the first transmission path is using the first physical link group to transmit data;

when the second device is authorized to switch the first physical link from the first physical link group to the second physical link group, performing the following:
  switching, by the second device, the first physical link from the first physical link group to the second physical link group; and
  continuing receiving the data through the first transmission path, wherein after the first physical link is switched from the first physical link group to the second physical link group the first transmission path uses the first physical link that is comprised in the second physical link group.

11. The method according to claim 10, wherein after receiving the first link switching notification message sent by the first device, the method further comprises:
  determining whether the second device is authorized to switch the first physical link from the first physical link group to the second physical link group; and
  when the second device cannot switch the first physical link from the first physical link group to the second physical link group, sending a first link switching feedback message to the first device, wherein the first link switching feedback message comprises information indicating that the second device cannot switch the first physical link from the first physical link group to the second physical link group.

12. The method according to claim 10, wherein after receiving the first link switching notification message sent by the first device, the method further comprises:
  determining whether the second device is authorized to switch the first physical link from the first physical link group to the second physical link group; and
  when the second device is authorized to switch the first physical link from the first physical link group to the second physical link group, and after the first physical link is switched from the first physical link group to the second physical link group, sending a first link switching feedback message to the first device, wherein the first link switching feedback message comprises information indicating that the second device has successfully switched the first physical link from the first physical link group to the second physical link group.

13. The method according to claim 10, wherein after continuing receiving the data through the first transmission path, the method further comprises:
  decapsulating the data using a transport layer protocol corresponding to the first physical link in the first physical link group.

14. The method according to claim 10, wherein switching the first physical link from the first physical link group to the second physical link group comprises:
  switching, based on the first link switching notification message, the first physical link used by the first transmission path from the first physical link to a second physical link; or
  in addition to the first physical link used by the first transmission path, adding the second physical link to the first transmission path based on the first link switching notification message.

15. A first device, comprising:
  at least one processor; and
  a non-transitory memory;
  wherein the non-transitory memory is configured to store a program that is executable by the at least one processor, and the program includes instructions for:
    obtaining a first transmission path used for data transmission, wherein when the first transmission path is obtained the first transmission path is using a first physical link group to transmit data to a second device, the first physical link group comprises a first physical link, and the first transmission path uses the first physical link to transmit the data;
    attempting to switch, based on a preconfigured link switching policy and transmission information of the first transmission path, the first physical link used by the first transmission path from the first physical link group to a second physical link group, wherein the second physical link group comprises a second physical link, and the transmission information comprises information obtained by monitoring the first physical link group used by the first transmission path;
    sending a first link switching notification message to the second device, wherein the first link switching notification message comprises information indicating the attempt to switch the first physical link from the first physical link group to the second physical link group; and
    in response to the first physical link used by the first transmission path successfully switching from the first physical link group to the second physical link group, continuing transmitting the data through the first transmission path, wherein after the first physical link used by the first transmission path switches from the first physical link group to the second physical link group the first transmission path uses the first physical link that is comprised in the second physical link group.

16. The first device according to claim 15, wherein the program includes instructions for:
  when the first transmission path uses the first physical link group to tra nsmit the data, obtaining path availability information based on a quantity of links and a quantity of paths that are used by the first device, wherein the path availability information comprises information about whether the first transmission path is available to continue to be used by the first physical link group; and
  attempting to switch, based on the preconfigured link switching policy and the path availability information, the first physical link used by the first transmission path from the first physical link group to the second physical link group.

17. The first device according to claim 15, wherein the program includes instructions for:
  before obtaining the first transmission path, obtaining a content type of the data and a data volume of the data; and
  configuring the first physical link group for the first transmission path based on the content type and the data volume.

18. The first device according to claim 15, wherein the program further includes instructions for:
  obtaining authentication information of the first physical link in the first physical link group; and
  when an authentication of the first physical link succeeds, determining, based on the authentication information of the first physical link, that authentication of the first physical link in the second physical link group between first device and the second device has succeeded.

19. The first device according to claim 15, wherein the program includes instructions for:
   encapsulating the data using a transport layer protocol corresponding to the first physical link in the first physical link group; and
   in response to the first physical link used by the first transmission path successfully switching from the first physical link group to the second physical link group, continuing transmitting, through the first transmission path, the data that is encapsulated using the transport layer protocol, wherein after the first physical link used by the first transmission path switches from the first physical link group to the second physical link group the first transmission path uses the first physical link that is comprised in the second physical link group.

20. The first device according to claim 15, wherein the program further includes instructions for:
   after sending the first link switching notification message to the second device, receiving a first link switching feedback message sent by the second device; and
   performing the following:
   in response to the first link switching feedback message indicating that the second device cannot switch the first physical link from the first physical link group to the second physical link group, switching, based on the preconfigured link switching policy and the transmission information of the first transmission path, the first physical link used by the first transmission path from the first physical link group to a third physical link group, and sending a second link switching notification message to the second device; or
   in response to the first link switching feedback message indicating that the second device has successfully switched the first physical link from the first physical link group to the second physical link group, continuing transmitting the data through the first transmission path that uses the second physical link group, wherein after the first physical link switches from the first physical link group to the second physical link group the first transmission path uses the first physical link that is comprised in the second physical link group.

\* \* \* \* \*